United States Patent  
Pahwa et al.

(10) Patent No.: US 9,224,218 B2
(45) Date of Patent: Dec. 29, 2015

(54) SYSTEM AND METHOD FOR LOADING AND RENDERING CURVED FEATURES IN A MAP

(75) Inventors: Aroon Pahwa, Palo Alto, CA (US); Christopher Blumenberg, San Francisco, CA (US); James A. Howard, Mountain View, CA (US); Jeffrey P. Hultquist, Cupertino, CA (US); Michael D. Schuster, Woodside, CA (US)

(73) Assignee: Apple Inc., Cupertino, CA (US)

( * ) Notice: Subject to any disclaimer, the term of this patent is extended or adjusted under 35 U.S.C. 154(b) by 380 days.

(21) Appl. No.: 13/609,792

(22) Filed: Sep. 11, 2012

(65) Prior Publication Data

US 2013/0321422 A1     Dec. 5, 2013

Related U.S. Application Data

(60) Provisional application No. 61/655,823, filed on Jun. 5, 2012.

(51) Int. Cl.
```
G06T 11/20      (2006.01)
G01C 21/36      (2006.01)
G01C 21/32      (2006.01)
```
(52) U.S. Cl.
CPC .............. *G06T 11/203* (2013.01); *G01C 21/32* (2013.01); *G01C 21/3638* (2013.01)

(58) Field of Classification Search
CPC ......... G06T 17/00; G06T 1/00; G06T 11/203; G01C 21/3638; G01C 21/32
USPC ................. 345/428, 522, 442; 701/32.3, 32.4
See application file for complete search history.

(56) References Cited

U.S. PATENT DOCUMENTS

| | | | | |
|---|---|---|---|---|
| 5,381,521 A * | 1/1995 | Ballard | ......................... | 345/442 |
| 6,029,173 A * | 2/2000 | Meek et al. | ................... | 707/696 |
| 6,058,200 A * | 5/2000 | Blaseio | ......................... | 382/100 |
| 6,313,838 B1 * | 11/2001 | Deering | ......................... | 345/420 |
| 6,330,858 B1 * | 12/2001 | McDonough et al. | ......... | 101/208 |
| 7,038,697 B2 * | 5/2006 | Gangnet et al. | ............... | 345/606 |
| 7,817,152 B2 | 10/2010 | Kokojima | | |

(Continued)

OTHER PUBLICATIONS

Funkhouser et al, Adaptive Display Algorithm for Interactive Frame Rates During Visualization of Complex Virtual Environments, 1993, Association for Computing Machinery, pp. 247-254.*

*Primary Examiner* — Stephen R Koziol
*Assistant Examiner* — Brian Kravitz
(74) *Attorney, Agent, or Firm* — Robert C. Kowert; Meyertons, Hood, Kivlin, Kowert & Goetzel, P.C.

(57) ABSTRACT

Embodiments of a system and method for loading and rendering curved features in a map are described. Embodiments may include a map tool of a mapping or navigation application configured to generate a display for a map that includes one or more curved features (e.g., curved roads or curved polygons). The map tool may be executed in a client/server environment in which a server portion receives digitized map data in the form of polylines, detects a curved feature in the map data by fitting it to a parametric curve, and transmits data representing the parametric curve to a client device for subsequent rendering. The client device may render the curved feature using the received parametric curve data or, dependent on characteristics of the client device, extract data corresponding to points on the parametric curve to generate a triangle mesh for rendering the curved feature at a suitable resolution.

14 Claims, 16 Drawing Sheets

(56) References Cited

U.S. PATENT DOCUMENTS

| | | | |
|---|---|---|---|
| 8,681,176 B1* | 3/2014 | Maurer et al. | 345/619 |
| 8,837,578 B2* | 9/2014 | Gavade et al. | 375/240 |
| 2002/0093501 A1* | 7/2002 | Lui et al. | 345/442 |
| 2003/0229441 A1* | 12/2003 | Pechatnikov et al. | 701/201 |
| 2008/0246758 A1 | 10/2008 | Strassenburg-Kleciak et al. | |
| 2008/0268822 A1* | 10/2008 | Johnson et al. | 455/414.2 |
| 2009/0141038 A1* | 6/2009 | Newaskar et al. | 345/589 |
| 2009/0198767 A1* | 8/2009 | Jakobson et al. | 709/203 |
| 2009/0228451 A1* | 9/2009 | Ko | 707/3 |
| 2010/0171746 A1* | 7/2010 | Nagai | 345/522 |
| 2011/0054770 A1* | 3/2011 | Allen et al. | 701/200 |
| 2011/0063301 A1* | 3/2011 | Setlur et al. | 345/441 |
| 2011/0199381 A1* | 8/2011 | Tamai | 345/442 |
| 2012/0022781 A1* | 1/2012 | Wilson | 701/410 |
| 2012/0159357 A1* | 6/2012 | Lim et al. | 715/760 |
| 2013/0278594 A1* | 10/2013 | Kaatz et al. | 345/419 |

\* cited by examiner

SYSTEM AND METHOD FOR LOADING AND RENDERING CURVED FEATURES IN A MAP

This application claims benefit of priority to U.S. Provisional Application Ser. No. 61/655,823, entitled "System And Method For Loading And Rendering Curved Features In A Map," filed Jun. 5, 2012.

BACKGROUND

1. Technical Field

This disclosure relates generally to map rendering, and, more specifically, to functionality of devices providing map applications.

2. Description of the Related Art

Personal navigation devices (e.g., handheld GPS devices and some mobile phones) and other computing devices implement mapping applications capable of displaying a map that includes one or more curved features. For example, a map may include curved roads and/or curved polygons (e.g., polygons that represent buildings, bridges, or other structures, parks, bodies of water, etc., some of which may include one or more curved elements). A typical mapping application utilizes digitized map data that represents each such curved feature as a series of connected points (or vertices) known as a polyline, and renders the curved feature as a series of line segments between the digitized points.

SUMMARY OF EMBODIMENTS

The present disclosure describes embodiments of a system and method for loading and rendering curved features in a map. Embodiments of the present disclosure may enable a system to implement a mapping application that models a curved feature of a map as a Bézier curve or using another type of parametric curve representation. Parametric curve data representing a given curved map feature may be more compact than digitized point data for the curved map feature, and the use of parametric curve data to represent a curved map feature may allow the curved map feature to be rendered with high resolution at any scale.

In some embodiments, a server may fit a Bézier curve to a series of digitized map points that represent a curved map feature (e.g., a polyline). The server may transmit data representing the Bézier curve to a client device for subsequent rendering within the context of the map. For example, the server may transmit data representing the control points of the Bézier curve to the client device.

The client device may receive the data representing the Bézier curve and may render the curved map feature directly from the received curve data if the performance and/or display characteristics of the device on which the curved map feature is to be rendered are suitable for rendering the map, including the curved map feature, at the desired scale. Otherwise, the client device may (adaptive to various performance and/or display characteristics of the client device on which the curved map feature is to be rendered) extract data representing a number of curve points from the Bézier curve data that is appropriate for displaying the curved map feature at a desired scale with acceptable resolution. The client device may then render the map, including the curved map feature, based on the extracted point data (e.g., with the extracted point data defining the vertices of a triangle mesh).

In some embodiments, in order to subsequently display the curved map feature at a larger scale (e.g., zoomed in), the client device may re-evaluate the Bézier curve data to extract data representing a larger number of curve points. The client device may then re-render the map (including the curved map feature) at the larger scale using the data representing the larger number of curve points.

Figure 1A:
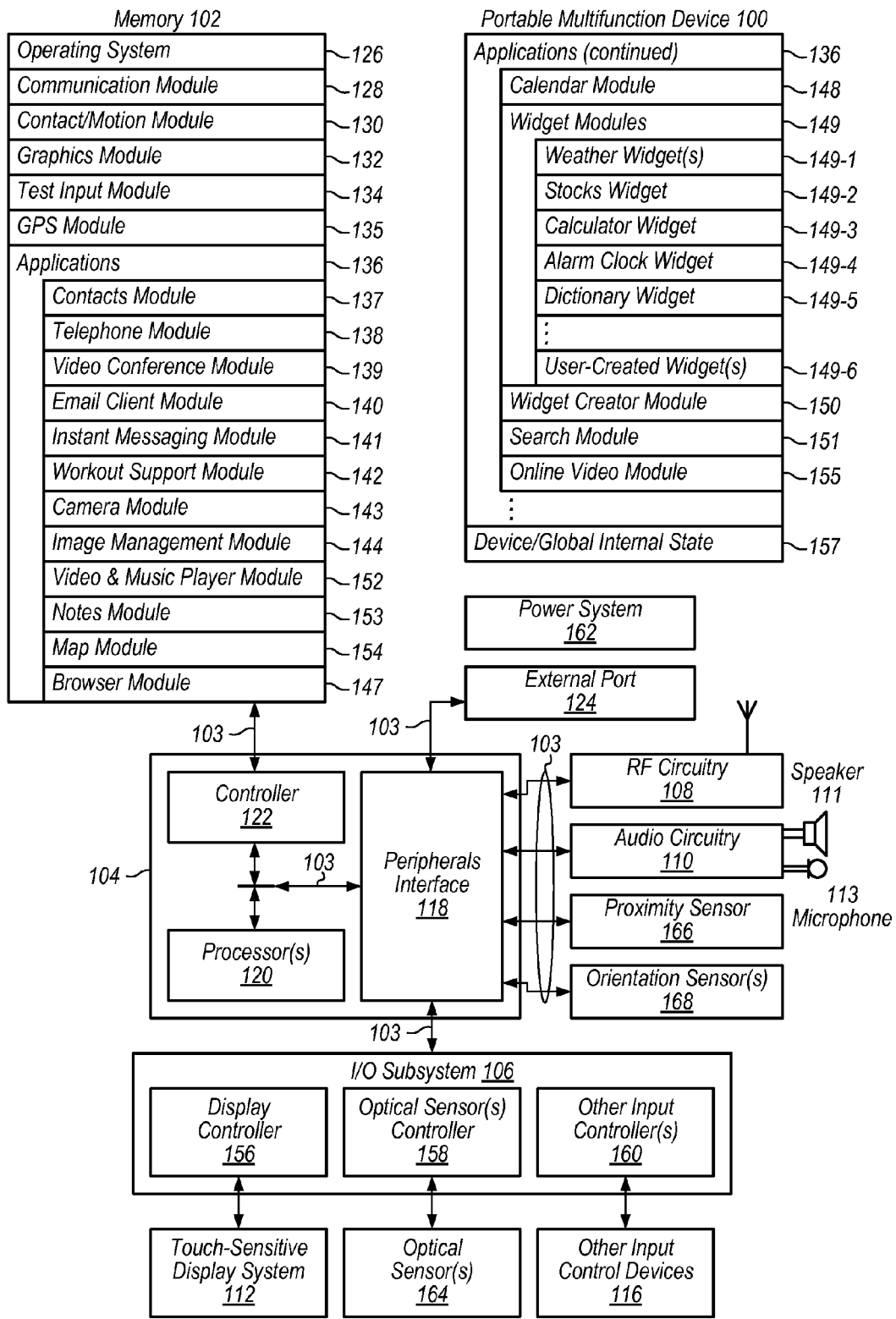
FIG. 1A illustrates a block diagram illustrating a portable multifunction device with a touch-sensitive display in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units...." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Various embodiments of a system and method for loading and rendering curved features in a map are described. In some embodiments, the map tools, mapping applications and/or navigation applications described herein may be implemented as part of a multifunction device, including but not limited to mobile phones that have GPS functionality, tablet computing devices, and personal navigation devices. A user of the multifunction device may interact with a mapping application capable of displaying a map that includes one or more curved features (e.g., curved roads, buildings, bridges, or other structures, and/or geographic features, such as parks or bodies of water, that include one or more curved elements).

In the real world, roads and structures may be infinitely curved. However, typical digital mapping applications (or clients thereof) render roads as a series of points, e.g., based on digitized map data. Since a displayed map can only be as accurate as the input data received by the mapping application that presents it, curved map features may appear to be more "jaggy" than they are in the real world. With such applications, in order to render a nice looking curve using a series of points, data representing a very large number of points may be required when modeling the curved map feature. In some embodiments, the systems described herein may model curved map features as parametric curves (e.g., as Bézier paths). By modeling curved map features using parametric curve representations, the system may render them such that they appear as smooth curves no matter the scale at which they are displayed. In addition, modeling curved map features using parametric curve representations may reduce the amount of data needed to represent those features. For example, instead of representing a curved road in terms of 100 or 1000 connected points, a curved road may be represented as a curve that is defined by only a handful of control points.

As noted above, embodiments of the present disclosure may enable a system to implement a mapping application that models a curved feature of a map as a Bézier curve or using another type of parametric curve representation. Parametric curve data representing a given curved map feature may be more compact than digitized point data for the curved map feature, and the use of parametric curve data to represent a curved map feature may allow the curved map feature to be rendered with high resolution at any scale.

In some embodiments, a server may fit a Bézier curve to a series of digitized map points that represent a curved map feature (e.g., a polyline). The server may transmit data representing the Bézier curve to a client device for subsequent rendering within the context of the map. For example, the server may transmit data representing the control points of the Bézier curve to the client device.

The client device may receive the data representing the Bézier curve and may render the curved map feature directly from the received curve data if the performance and/or display characteristics of the device on which the curved map feature is to be rendered are suitable for rendering the map, including the curved map feature, at the desired scale. Otherwise, the client device may (adaptive to various performance and/or display characteristics of the client device on which the curved map feature is to be rendered) extract data representing a number of curve points from the Bézier curve data that is appropriate for displaying the curved map feature at a desired scale with acceptable resolution. The client device may then render the map, including the curved map feature, based on the extracted point data (e.g., with the extracted point data defining the vertices of a triangle mesh).

In some embodiments, in order to subsequently display the curved map feature at a larger scale (e.g., zoomed in), the client device may re-evaluate the Bézier curve data to extract data representing a larger number of curve points. The client device may then re-render the map (including the curved map feature) at the larger scale using the data representing the larger number of curve points.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1A shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

Figure 3:
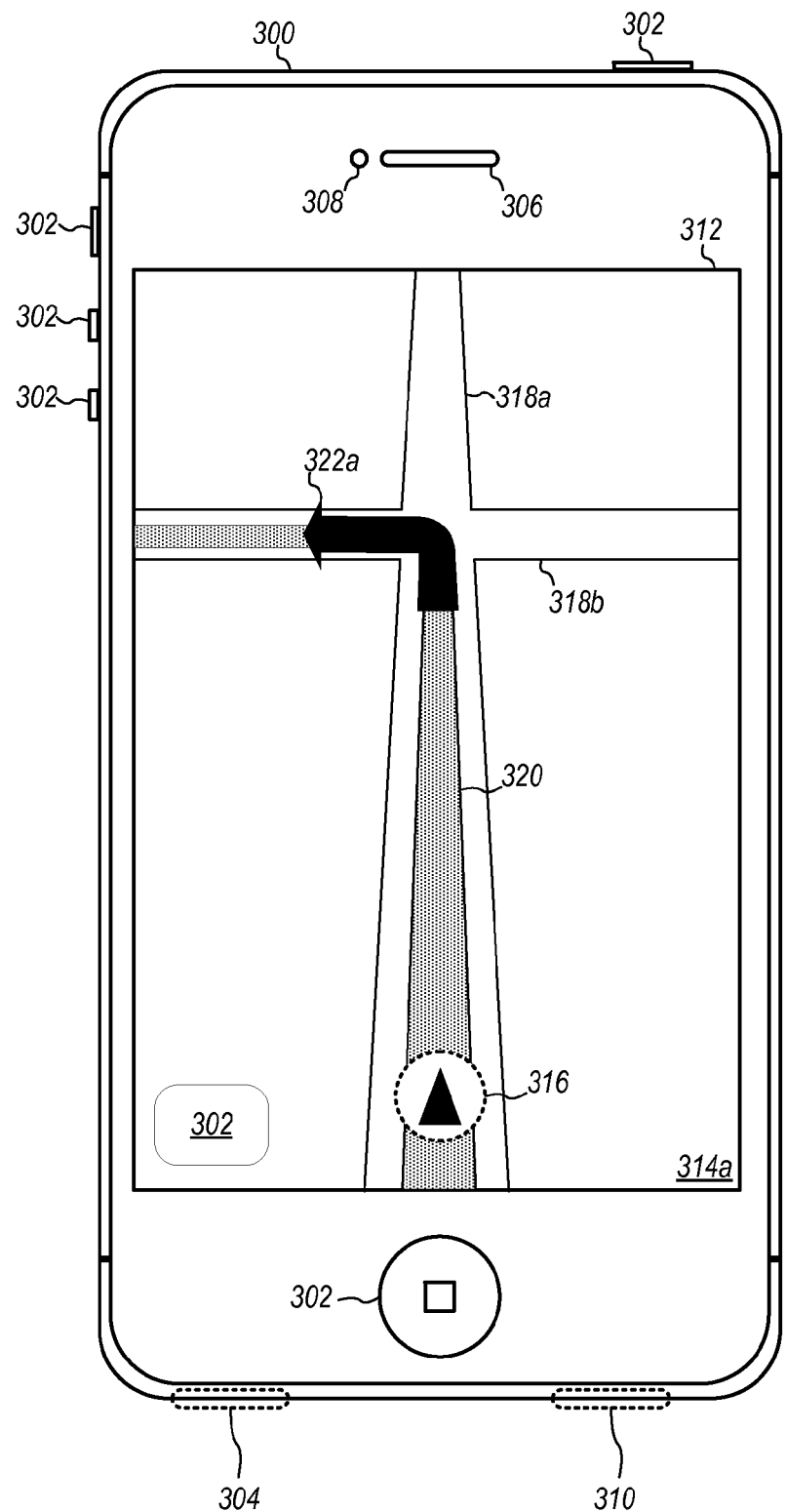
FIG. 3 illustrates a multifunction device implementing a navigation application in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
 contacts module 137 (sometimes called an address book or contact list);
 telephone module 138;
 video conferencing module 139;
 e-mail client module 140;
 instant messaging (IM) module 141;
 workout support module 142;
 camera module 143 for still and/or video images;
 image management module 144;
 browser module 147;
 calendar module 148;
 widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;
search module 151;
video and music player module 152, which may be made up of a video player
module and a music player module;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
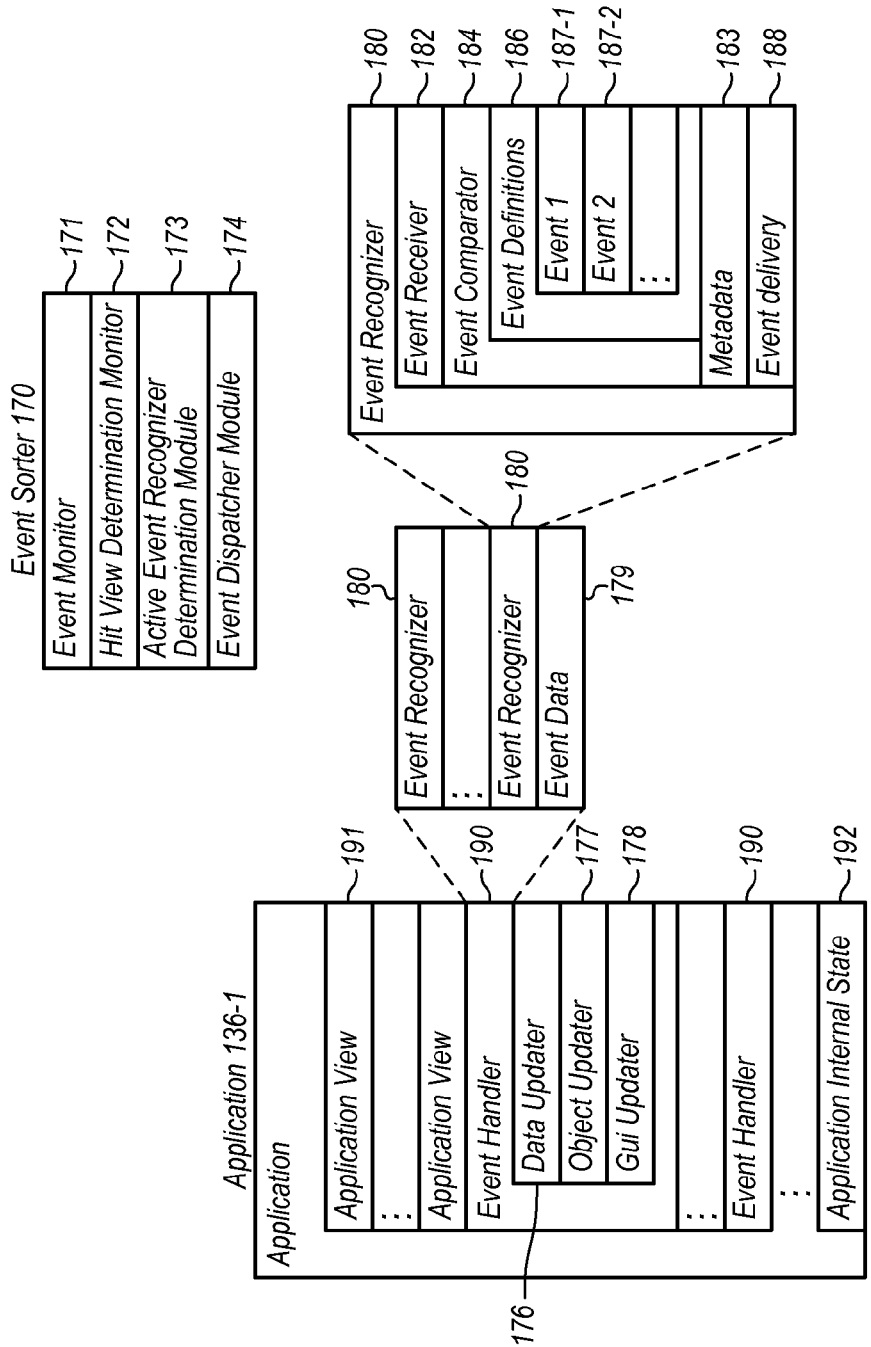
FIG. 1B illustrates a block diagram illustrating example components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch sensitive display 112, as part of a multi-touch gesture). Peripherals interface 118 transmits information it receives from I/O subsystem 106 or a sensor, such as proximity sensor 166, orientation sensor(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes multiple event handlers 190 and one or more application views 191, each of which includes instructions for handling touch events that occur within a respective view of the application's user interface. Each application view 191 of the application 136-1 includes one or more event recognizers 180. Typically, a respective application view 191 includes multiple event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, includes a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, includes a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
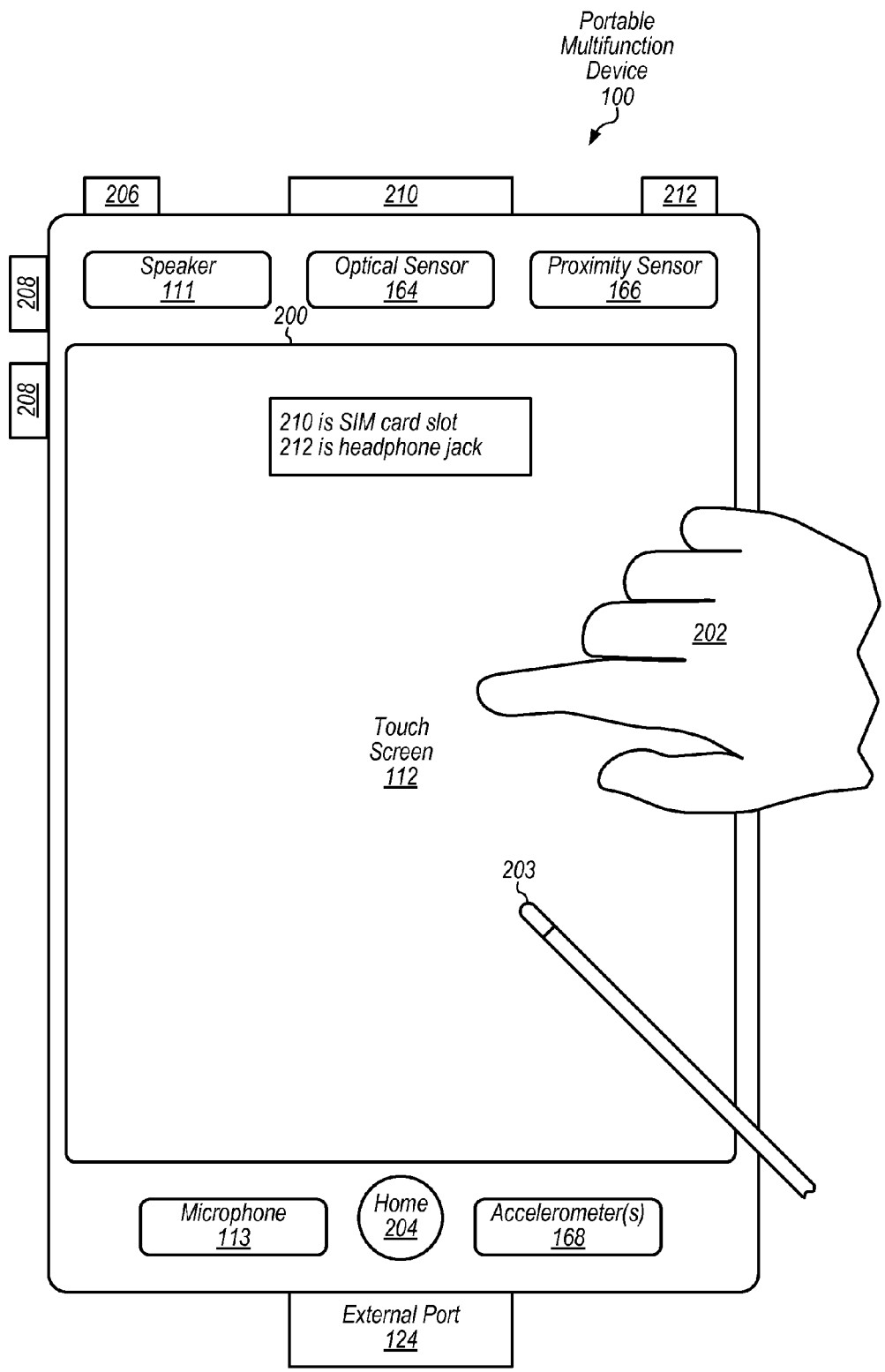
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the following examples will be given with reference to inputs on touch screen 112 (where the touch sensitive surface and the display are combined), a touch-sensitive surface that is separate from the display may be used instead of touch screen 112.

Mapping Functionality

FIG. 3 illustrates another example of a multifunction device, which may be configured in a manner similar to the multifunction device described above. In the illustrated embodiment, a multifunction device 300 includes a mapping application (e.g., map module 154 described above) that may be stored in one or more memories of multifunction device 300 and executed on one or more processors of multifunction device 300. As is the case for the multifunction device described above, multifunction device 300 may include one or more controls 302 for operating the multifunction device. These controls may include but are not limited to power controls for turning the device on and off, volume controls for adjusting the ear piece volume or the speaker volume, menu controls for navigation functions of the device, and function controls for initiating one or more function or actions on the device. Controls 302 may include hardware controls or software controls. For instance, the bottom left corner of electronic display 312 includes a graphical representation of a control 302 that may be selected by a user, such as by way of touch in accordance with the touch screen functionality described above. Multifunction device 300 may also include other components similar to those described above, such as a microphone 304, an earpiece 306 (e.g., a speaker through which to convey audio representations of telephone calls), an optical sensor 308, and/or a speaker 310. Each of these components may be configured in a similar manner to those like-named components of FIG. 2 described above. Furthermore, electronic display 312 may be configured with touch screen capability, such as touch screen 112 described above.

As noted above, multifunction device 300 includes a mapping application that may be stored in one or more memories of multifunction device 300 and executed on one or more processors of multifunction device 300. In the illustrated embodiment, the graphical representation of the mapping application may include a map instance 314*a* of a geographic region. This map may be presented as a two-dimensional map or a three-dimensional map, the selection of which may be specified through, e.g., a user-configurable parameter of the mapping application. Map instance 314*a* may include a graphical position indicator 316, which may represent the location of the multifunction device within the geographic region of the map. Generally position indicator 316 may represent the current or real-time position of the multifunction device, although it should be understood that in some cases there may exist some small amount of temporal latency between the actual position of the multifunction device and the graphical representation of that location (e.g., position indicator 316). This may occur, e.g., when the multifunction device is in motion.

Furthermore, multifunction device 300 may generally be operated by a user. For example, multifunction device 300 may in some cases be a smartphone utilized by an individual to make phone calls, send text messages, browse the internet, etc. As use of multifunction device by an individual generally implies the individual is proximate to the multifunction device (e.g., the user may be holding the device in his or her hand), references herein to the location of the device and the location of the user may be considered to be synonymous. However, it should be understood that in some cases the actual position of the multifunction device and the user of that device may differ by some distance. For instance, the user may place his or her multifunction device on a table of an outdoor café while sitting in a nearby chair. In this case, the position of the device and the position of the user may differ by some small amount. In another example, multifunction device 300 may be mounted on a car dashboard (e.g., for use as a navigation device) while the user of the device sits nearby (e.g., in the driver seat of the car). In this case as well, the position of the device and the position of the user may differ by some small amount. Despite these small differences in position, generally the position of the multifunction device and the position of the multifunction device user may be considered to coincide.

In various embodiments, the map instance 314*a* displayed by the multifunction device may include one or more roads (e.g., roads 318*a-b*), buildings (not illustrated), terrain features (e.g., hills, mountains) (not illustrated), parks (not illustrated), water bodies (not illustrated), and/or any other item that may be conveyed by a map. In some cases, the map may also include other map or navigation information including but limited to readouts from one or more of a directional compass, an altimeter, and/or a thermometer.

In various embodiments, the mapping application may be configured to generate directions from an origination (e.g., an address or a user's current position) to a destination (e.g., an address, landmark, or point of interest). For instance, an indication of the origination and/or destination may be input into the multi function device by the user. The multifunction device may generate one or more candidate routes between those two points. The multifunction device may select one of those routes for display on the device. In other cases, multiple candidate routes may be presented to the user and the user may select a preferred route. In the illustrated embodiment, one route is illustrated as route 320. The route may also include turn-by-turn directions which may be presented to the user, such as a graphical indication to perform a turn 322*a* from road 318*a* to road 318*b*. In some embodiments, this graphical indication to perform a turn may be supplemented or substituted with an audible indication to turn, such as a voice command from speaker 310 that indicates the user is to "turn left in 100 yards," for example.

In various embodiments, the mapping application of the multifunction device may be configured to track the position of the user over time and correspondingly adjust the graphical position indicator 316 to indicate the new position. For instance, the mapping application may determine that the user is traveling along route 320 from position information (e.g., information from GPS module 135) and update the map instance 314*a* accordingly. For instance, in some cases the map instance 314*a* may remain stationary while position indicator 316 is moved along the route. In other cases, position indicator 316 may remain stationary or "fixed" while map instance 314*a* is moved (e.g., panned, turned, etc.) around the position indicator.

In other embodiments, the mapping application may be configured to perform other functions including but not limited to geocaching, creating or interpreting waypoints, searching for and displaying points of interest (POIs) (e.g., gas stations, banks, grocery stores, etc.), displaying traffic information, and/or any other functionality useful for navigation.

Further note that the positioning capability of the multifunction device and the mapping application need not be limited to any particular type of transportation. The techniques described herein may be well-suited for all kinds of transportation including but not limited to walking, cycling, driving, or utilizing public transportation.

Mapping Application—Rendering Curved Map Features

Figure 4A:
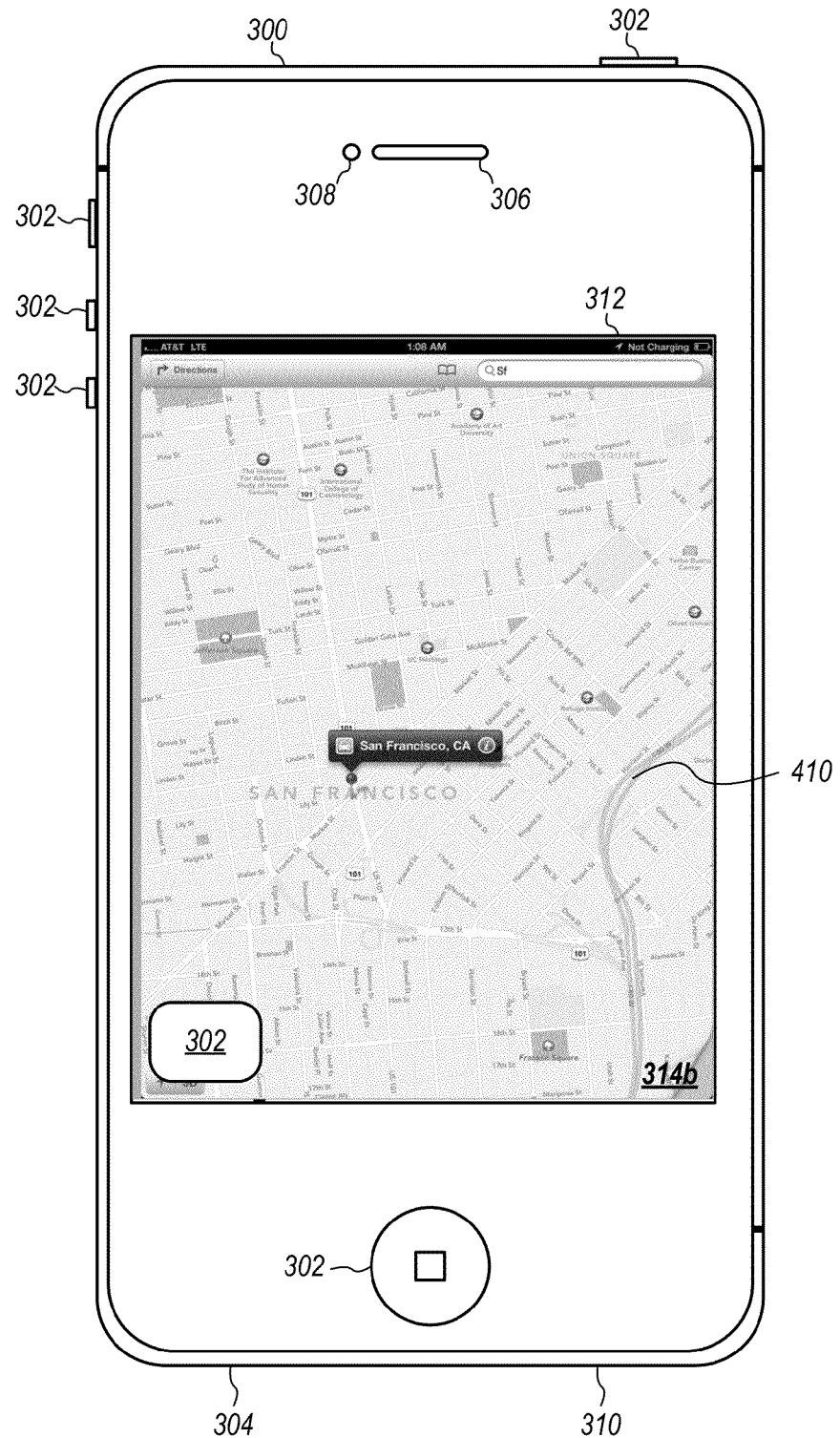
FIG. 4A illustrates a multifunction device on which a mapping application is displaying a map containing a curved road, according to some embodiments.
Figure 4B:
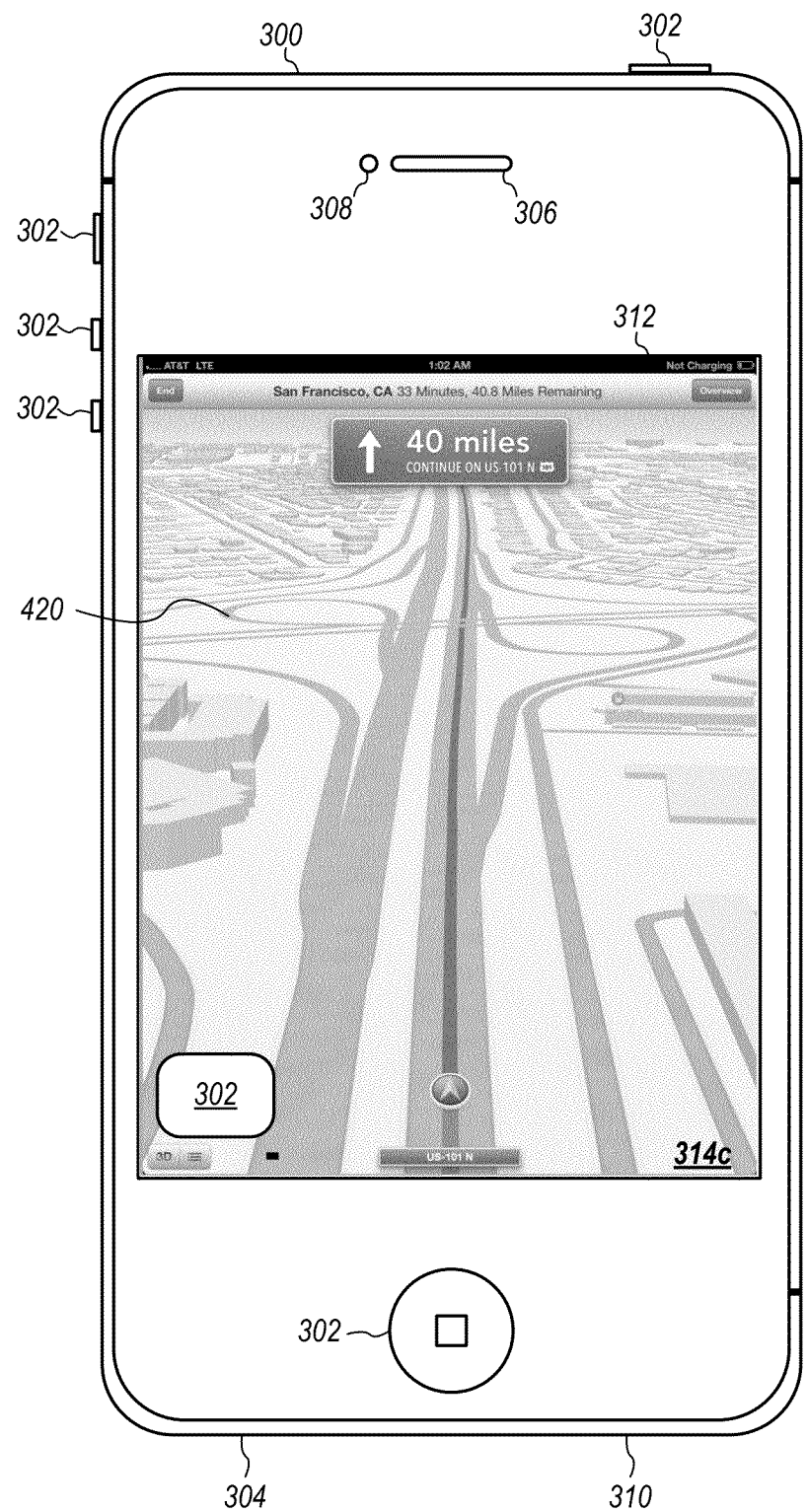
FIG. 4B illustrates a multifunction device on which a navigation application is displaying a map containing curved roads, according to some embodiments.
Figure 5:
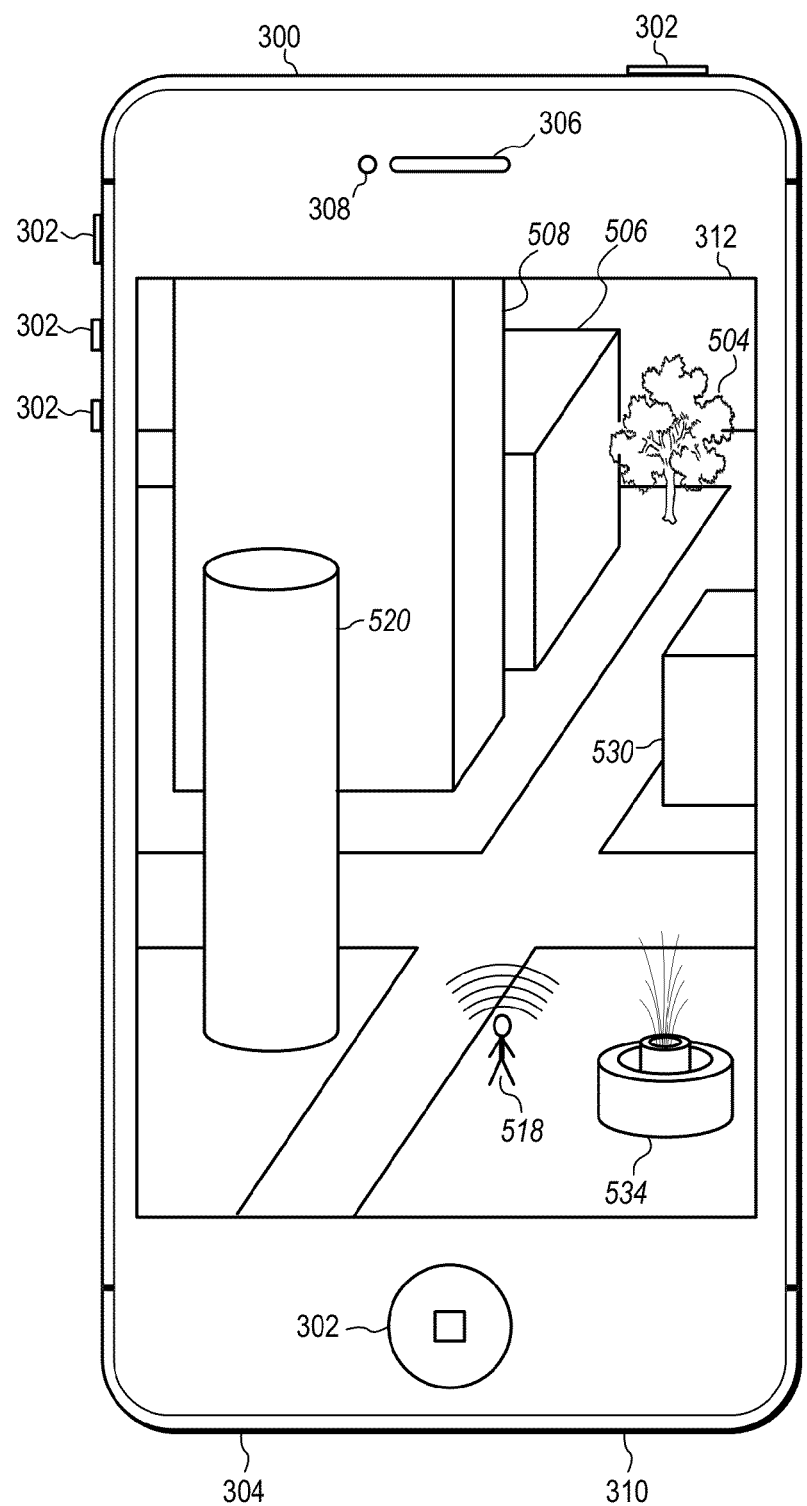
FIG. 5 illustrates a multifunction device on which on which a mapping application or a navigation application is displaying a map containing curved polygons, according to some embodiments.

In some cases, maps may include curved features that depict curved structures or objects in the real world. For example, they may include curved roads and/or curved polygons (e.g., polygons representing curved buildings, bridges, or other structures, parks, bodies of water, etc.). FIG. 4A illustrates an example of the display of such a map on a multifunction device using a mapping application, according to some embodiments. In this example, map instance 314*b* includes a portion of a map of San Francisco, Calif. The displayed portion of the map contains several curved roads, including Interstate Highway I-80W (labeled as 410 in FIG. 4A). FIG. 4B illustrates an example display of another such map using a navigation application, according to some embodiments. In this example, map instance 314*c* depicts a map view that includes a clover leaf feature of US Highway 101N (labeled as 420 in FIG. 4B). In another example, FIG. 5 illustrates a simplified bird's eye perspective of a portion of a city map being displayed by a mapping application or a navigation application, according to one embodiment. In this example, the map includes buildings 506, 508, 520, and 530. As illustrated in this example, some buildings (such as building 520) may have curved shapes. The map view may also include other arbitrarily shaped objects, such as tree 504, fountain 534, or user 518, some of which may include curved components or sub-components.

As previously noted, in digital map data, curved roads and polygons are typically described in terms of one or more series of connected points known as a polylines. As a result, once rendered, curved roads and polygons may appear more "jaggy" in a displayed map than they are in the real world. In some embodiments, the systems described herein may define and/or render curved roads and polygons using parametric curve representations. For example, in some embodiments, a server that obtains digitized map data (e.g., from a map service) may detect that a given map feature includes a curve based on the polylines in the received map data, and may fit the received data corresponding to the detected curve of the map feature to a parametric curve (e.g., to a Bézier path). In some embodiments, data representing the Bézier path may be sent to a client device for subsequent rendering by a map tool as a smooth curve. This data (e.g., data representing a small number of control points that define the Bézier path) may be a much more compact representation of the curved map feature than the original source data (which may have been a reasonably high resolution set of points for a curved road or polygon), and may require less data to be transferred (e.g., wirelessly or over a wire) to the client device.

In some embodiments, the client may render the received data as is (e.g., it may render the Bézier path directly) if the performance of the mapping application would be acceptable given the available hardware, e.g., the processing power available on one or more CPUs or graphics processing units (GPUs) of the client device. For example, in some embodiments, the received curve data may be rendered using a shader program that executes on a high-performance GPU of the client device.

If acceptable performance cannot be achieved by rendering the Bézier curve directly, the client may extract as many points as it deems appropriate from the Bézier path data (e.g., dependent on the desired scale and/or resolution at which to display the curved map feature), and may render the curved map feature as highly detailed polylines that appear very similar to directly rendered curves. In other words, if the available hardware on the client device is not able to render curves directly and/or efficiently (given its inherent capabilities and/or its current workload), the client may convert the received curve data into a series of points that includes more data than was available in the source map data (i.e., the digital map data that was originally received by the server). As described in more detail below, in some embodiments, the client device may be configured to determine the resolution at which the curved map feature should be displayed and/or the density of the set of points along the curve that is required to display the curved map feature at a particular resolution given the current zoom level, the portion of the curved map feature that will be visible in the current map view, the characteristics of the physical display on the client device, and/or the performance characteristics of the client device. In some such embodiments, the curve may be evaluated on a CPU of the client device, which may create a list of points and/or corresponding triangles (e.g., a triangle strip, triangle mesh, or another similar structure) that represent the curve, and this structure may be drawn by a GPU of the client device. The curve may be evaluated in light of the current zoom level and/or the resolution at which the curved map feature is to be displayed on the client device.

Example Methods

Various embodiments of systems and methods for loading and rendering curved features in a map may include methods that may be performed on one or more computers (such as computer system 1400 illustrated in FIG. 14 below) or portable electronic devices, such as the multifunction devices 300 described above. FIGS. 6-9 illustrate various examples of such methods.

As previously noted, in some embodiments, a map tool on a client device may receive data representing the control points of Bézier curves that correspond to curved map features in the area of a map to be displayed. This Bézier curve data may define the curves in any arbitrarily fine level of detail/granularity, as provided by a server from which it is received. In various embodiments, the map tool may evaluate the Bézier curve data it receives and then render the corresponding curved map features at a given level of precision based on the position of the virtual camera through which it is viewed in the map tool (e.g., the zoom level of the current map view), on the current performance capability of the client device (due to the available processing hardware, the current workload, etc.), and/or other device characteristics or factors.

For example, if the map view is zoomed way out, only a handful of points on the curve may need to be evaluated (and corresponding triangles created) to make the appearance of a given curved map feature acceptable (i.e., to make the curve appear to be reasonably smooth). If the map view is zoomed way in, however, more points on the curve may need to be evaluated in order to display a smooth curve. In other words, in some embodiments, while the curve may be represented and/or rendered by the map tool on the client device using line segments, the map tool may be able to represent the curve using line segments having a higher level of resolution than that found in the original digitized map data by generating higher resolution line segments from the fitted parametric curve data it receives. In some embodiments, curves rendered this way may scale better than those rendered from the original digitized map data, and may appear to the user like smooth curves even when the map view is zoomed way in. In some embodiments, as the zoom level changes, the map tool may be configured to produce a new triangle mesh for a given curve and to provide the new triangle mesh to the GPU for re-rendering at pre-defined intervals. For example, in some embodiments, the map tool may be configured to produce a new triangle mesh for a given curve when the zoom level changes by a power of two. In other words, if a scene doubles in size, the curves in various map features may be re-rendered from the Bézier curve data at twice the previous resolution.

Figure 6:
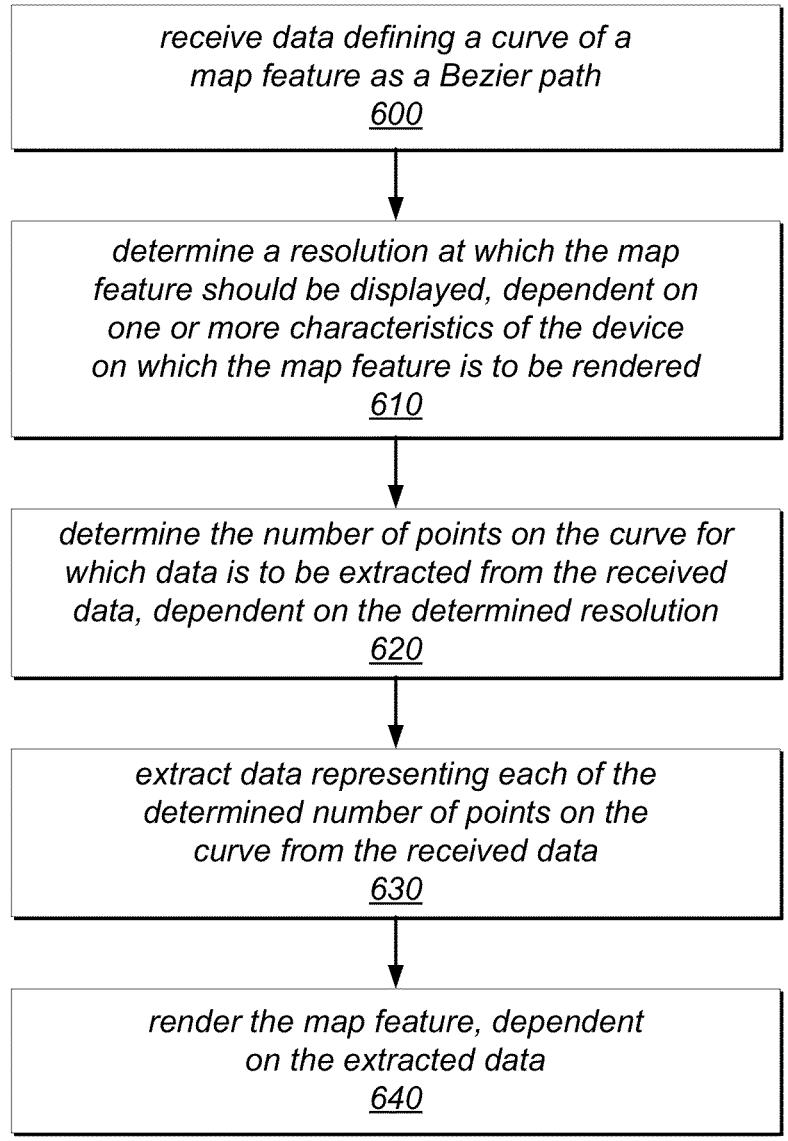
FIG. 6 is a flow diagram illustrating one embodiment of a method for loading and rendering curved features in a map.
Figure 7:
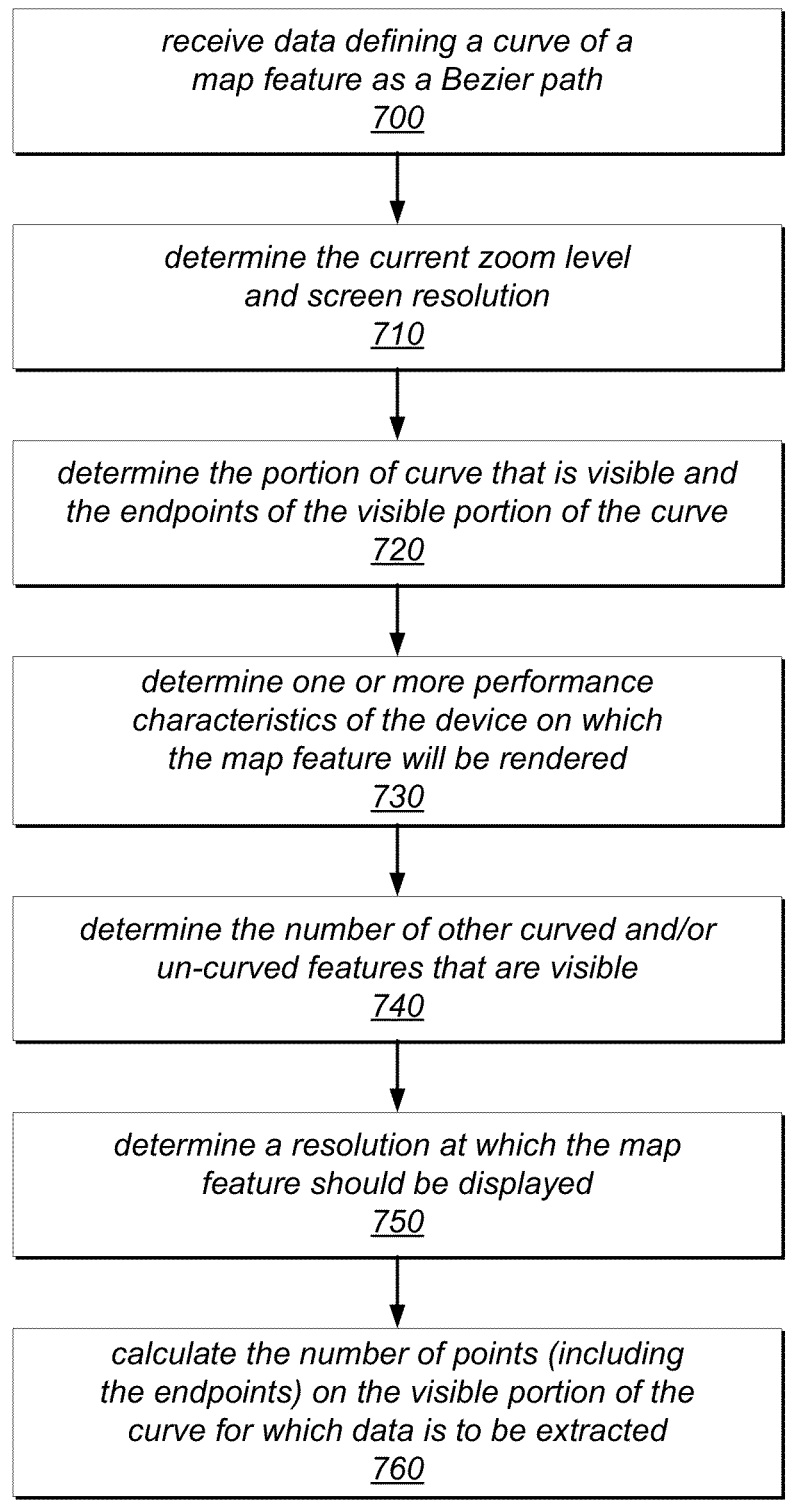
FIG. 7 is a flow diagram illustrating one embodiment of a method for determining a suitable resolution at which to display a curved map feature and for determining an appropriate budget for the number of points on the curve for which data should be extracted.

FIG. 6 is a flow diagram illustrating one embodiment of a method for loading and rendering curved features in a map. As illustrated at 600, the method may include receiving data defining a curve of a map feature as a Bézier path. For example, the client device may receive data representing a collection of control points that define the Bézier path. In other embodiments, the received data may define a curve using another type of parametric representation. In this example, the method may include determining the resolution at which the map feature should be displayed, dependent on one or more characteristics of the device on which the map feature is to be rendered (as in 610), and determining the number of points on the curve for which data is to be extracted from the received data, dependent on the determined resolution (as in 620). One embodiment of a method for determining a suitable resolution at which to display the map feature and for determining an appropriate budget for the number of points on the curve for which data should be extracted (i.e., the number of vertices to be used to represent and render the curve) is illustrated in FIG. 7 and described in detail below.

As illustrated at 630, in this example, the method may include extracting data representing each of the determined number of points on the curve from the received curve data (i.e. the data defining the curve as a Bézier path or using other type of parametric curve representation). In some embodiments, the method may include evaluating the received curve data to extract only the number of vertices needed to represent and render the portion of the curve that will be visible in the display (given the current map position and zoom level), while in other embodiments, the method may include evaluating the curve data to extract the number of vertices that would be needed to represent and render the entire curve according to the determined resolution. The method may then include rendering the map feature (e.g., a curved portion of a road or polygon) within the context of a map that contains the feature, dependent on the extracted data for each of the vertices (as in 640). As previously noted, rendering the map and/or the curved map feature may in some embodiments include passing data about the vertices of a triangle mesh to a GPU that renders curved map feature. Examples of such maps include any of the map instances described above (e.g., maps instances 314a-314c, or the map illustrated in FIG. 5).

In different embodiments, a map tool may apply a variety of criteria to determine a suitable resolution at which to display a curved map feature and to determine an appropriate budget for the number of points on the curve for which data should be extracted (i.e., the number of vertices to be used to represent and render the curve). Because the map tool on the client device receives parametric curve data (e.g., Bézier curve data) as its input, the decision about the amount of detail that should be included when rendering the curve may be determined on the client device dependent on the characteristics of the device, the current workload, and other factors that may or may not be known by the server at the time the parametric curve data is generated from the original digitized map data.

In some embodiments, the resolution at which a curved map feature is displayed and/or the number of vertices of a triangle mesh or other structure that are extracted from received parametric curve data and passed to a GPU for rendering the curved map feature may be dependent on the current zoom level for the map view that contains the curved map feature. In one example, for a given section of a curved road (e.g., a visible portion of the road), the map tool may be able to determine the distance between its endpoints. The map tool may choose a number of points (n) between those endpoints for which data should be extracted based on the distance between the two endpoints and how far apart they would appear when displayed on the screen of the client device. For example, the resolution may be chosen such that there is a point on the curve for every pixel or half-pixel on the screen along the curve (i.e., for the section of the road that is visible, or will be visible, in the current map view given the current zoom level). In this example, the map tool may evaluate the Bézier curve data at points along the curve corresponding to the determined number of points to achieve the desired resolution. These points may become the vertices of a list of triangles in a triangle strip or a triangle mesh that is submitted to the GPU for rendering the curved road.

In some embodiments, the resolution at which a curved map feature is displayed and/or the number of vertices of a triangle mesh or other structure that are extracted from received parametric curve data and passed to a GPU for rendering the curved map feature may be dependent on the performance characteristics of the client device and/or its current workload. For example, there may be a limit on the number of triangles (and corresponding vertices along one or more curved roads) that can be submitted to the GPU at a time, or that can be rendered simultaneously using the GPU at a speed that is acceptable for interactive mapping or navigation applications. Therefore, in a scene that includes a large number of roads (curved or otherwise), the map tool may render them with less than ideal resolution (i.e., such that they do not appear to be as smooth as possible), because it cannot submit as many triangles to the GPU as would be required for a higher resolution result. On the other hand, if there are only a handful of curved roads in a particular map view, the map tool may be able to perform a more detailed evaluation of the curve and to submit a triangle strip or mesh of sufficient resolution that the curved roads appear smooth to the user's eye. In some embodiments, the resolution that can be achieved may also be dependent on the amount of work being processed by one or more CPUs or GPUs of the client device on behalf of applications other than a mapping or navigation application.

Note that the budget for the number of vertices for which data should be extracted from parametric curve data may be dependent on the capabilities of the processor(s) on the client device and/or the display characteristics of the client device. For example, the latest version of a particular multifunction device may include a higher resolution screen and/or a more powerful GPU than an older version of the device or a different device, and the budget for the number of vertices may be dependent on which of these devices executes the map tool in addition to the current zoom level. In one example, an older device may be able to process something on the order of 20,000 vertices at an acceptable level of performance, while a newer device may be able to process 3-5 times that number. In some embodiments, the map tool on the client device may be configured to determine the characteristics of the client device on which it is running, and to set or adjust the budget for the number of vertices accordingly.

FIG. 7 illustrates one embodiment of a method for determining a suitable resolution at which to display the map feature and for determining an appropriate budget for the number of points on the curve for which data should be extracted (i.e., the number of vertices to be used to represent and render the curve). As illustrated at 700, in this example, the method may include receiving data that defines a curve of a map feature as a Bézier path, or using another type of parametric curve representation. The method may include determining the current zoom level and screen resolution for the map feature (and/or the map in which it is contained), as in 710. It may also include determining the portion of curve that is visible, and/or the endpoints of the visible portion of the curve, as in 720.

As illustrated in this example, the method may include determining one or more performance characteristics of the device on which the map feature will be rendered (as in 730). For example, in may include determining processor speed, availability and/or performance characteristics of a GPU, configuration and/or performance characteristics of available memory, screen resolution, operating system and/or application software versions, and/or any other performance-related characteristics of the device on which the curved map feature is to be displayed. In some embodiments, the method may include evaluating the current workload of the device on which the curved map feature is to be displayed. For example, it may include determining the number of other curved and/or un-curved map features that are visible (i.e., currently displayed) on the device, as in 740. As illustrated in this example, the method may include determining the resolution at which the map feature should be displayed (as in 750), dependent on any or all of the data described above. However, it should be noted that this determination may be made using more, less, or different information, in other embodiments. Once a suitable resolution has been determined, the method may include calculating the number of points (including the endpoints) on at least the visible portion of the curve for which data is to be extracted, dependent on the determined resolution (as illustrated at 760 and described herein).

As previously noted, in some embodiments, the source data for a map tool of a mapping or navigation application may include digital map data for roads and/or other curved map features that is provided as polylines, where a polyline is a series of points. For example, map data obtained from a map service or a map vender may be digitized data (i.e., set of points captured from a high-resolution photograph or other source). In some embodiments, a server (or a server portion of a map tool, mapping application or navigation application) may create a parametric curve representation for a curved map feature from the polylines and send them to a client (or a client portion of a map tool, mapping application or navigation application). For example, the server may fit a polynomial to the points of the original polylines to produce a Bézier curve representing the path for the road. In some embodiments, this may be performed only once at the server for each road or curved map feature, but various client devices may render the road or curved map feature many times at different scales (i.e., zoom levels) and/or resolutions, dependent on the particular map view being displayed, on the criteria described above, or on any other suitable criteria.

Figure 8:
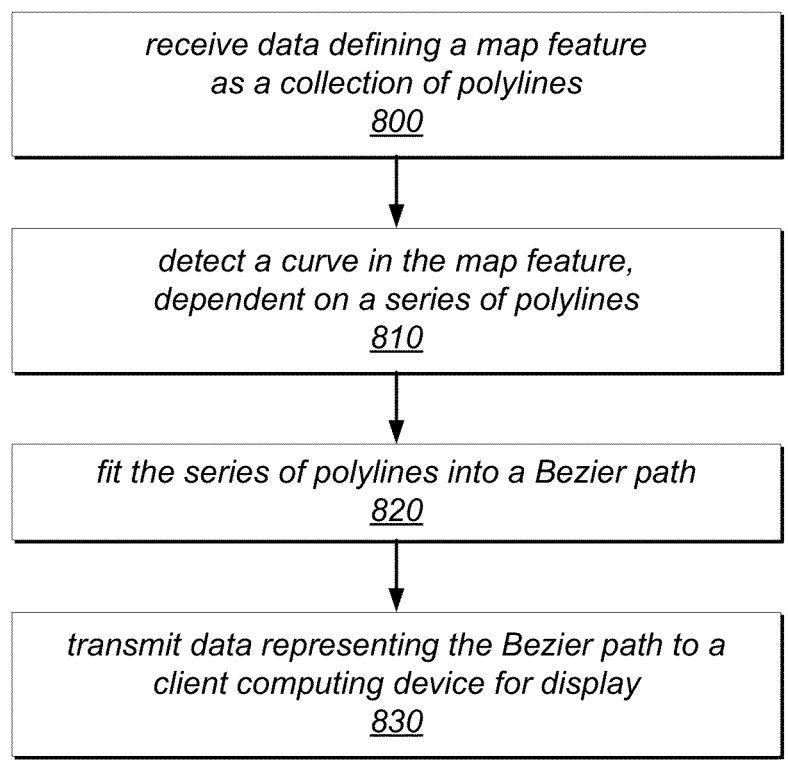
FIG. 8 is a flow diagram illustrating one embodiment of a method for providing curve data for a curved map feature to a client device.

One embodiment of a method for providing curve data for a curved map feature to a client device is illustrated by the flow diagram in FIG. 8. As illustrated at 800, in this example, the method may include a server receiving data defining a map feature as a collection of polylines. In various embodiments, this data may be received from a map vendor or map service (e.g., a service that provides map data over the Internet), accessed from a database of stored map information, or obtained in various other ways. The method may include the server detecting a curve in the map feature, dependent on a series of polylines included in the received map data (as in 810). As described herein, the server may detect the curve using any of a variety of methods, including by successfully attempting to fit a line or polynomial curve to the data points of the received polylines (or to portions thereof).

As illustrated in this example, the method may include the server fitting a series of polylines that has been detected as representing a curve into a Bézier path (as in 820), and transmitting data representing the Bézier path to a client computing device for display (as in 830). For example, the server may transmit to the client data defining the control points of a Bézier path that has been fitted to the curve detected in the originally received map data (i.e., the polylines). In some embodiments, the number of control points needed to represent the Bézier curve may be significantly smaller than the number of points contained in the received series of polylines that represent the map feature curve. Therefore, the amount of data that must to transmitted to the client to represent the map feature curve may be significantly smaller when the curve is represented by a Bézier curve (or another parametric curve representation) than if the curve were to be represented using the received series of polylines.

In some embodiments, the systems and methods described herein may allow a map tool (e.g., a map tool that is a component of or called by a mapping application or a navigation application) to reconstruct information about a curved map feature (e.g., a curved road or polygon) that was lost when it was digitized. For example, while the real world map feature itself (i.e., the road, structure, park, body of water, or other feature) may be infinitely curved (now matter how closely it is observed), a digitized version of the map feature may not include enough information to allow it to be displayed as a smooth curve. In some embodiments, by detecting a curved map feature in the digitized data (e.g., by fitting a curve to the data) and constructing a parametric curve representation of the curved map feature, that information (i.e., the fact that a curved feature existed in the real world depicted by the map) may be regained and submitted for subsequent rendering using one of a variety of curve rendering procedures (e.g., on a multifunction device on which the map tool, mapping application or navigation application is executing).

Note that digitized map data for a curved map feature that is obtained from a map service or map vendor may in some cases include too few digitized data points to be able to zoom in on the map feature it represents without a significant decrease in the quality of the display. On the other hand, digitized map data for a curved map feature that is obtained from a map service or map vendor may in some cases include too many digitized data points to be able to transmit them all to a client device for subsequent rendering and/or to process them all at the client device, once received. As previously noted, in some embodiments, by examining digitized map data obtained from a map service or map vendor and inferring a curve from the data, the system described herein may be able to represent the curve using fewer data points than the number of points that were included in the original digitized data, while providing the client with a highly (if not infinitely) scalable representation of the curve. For example, for a Bézier curve representation of a section of a curved road, the only data sent to the client may be the data for the control points (e.g., data for only a handful of control points), as opposed to digitized data for a large collection of points along the curve (e.g., data for dozens of points or more for the same section of the curved road).

Figure 9:
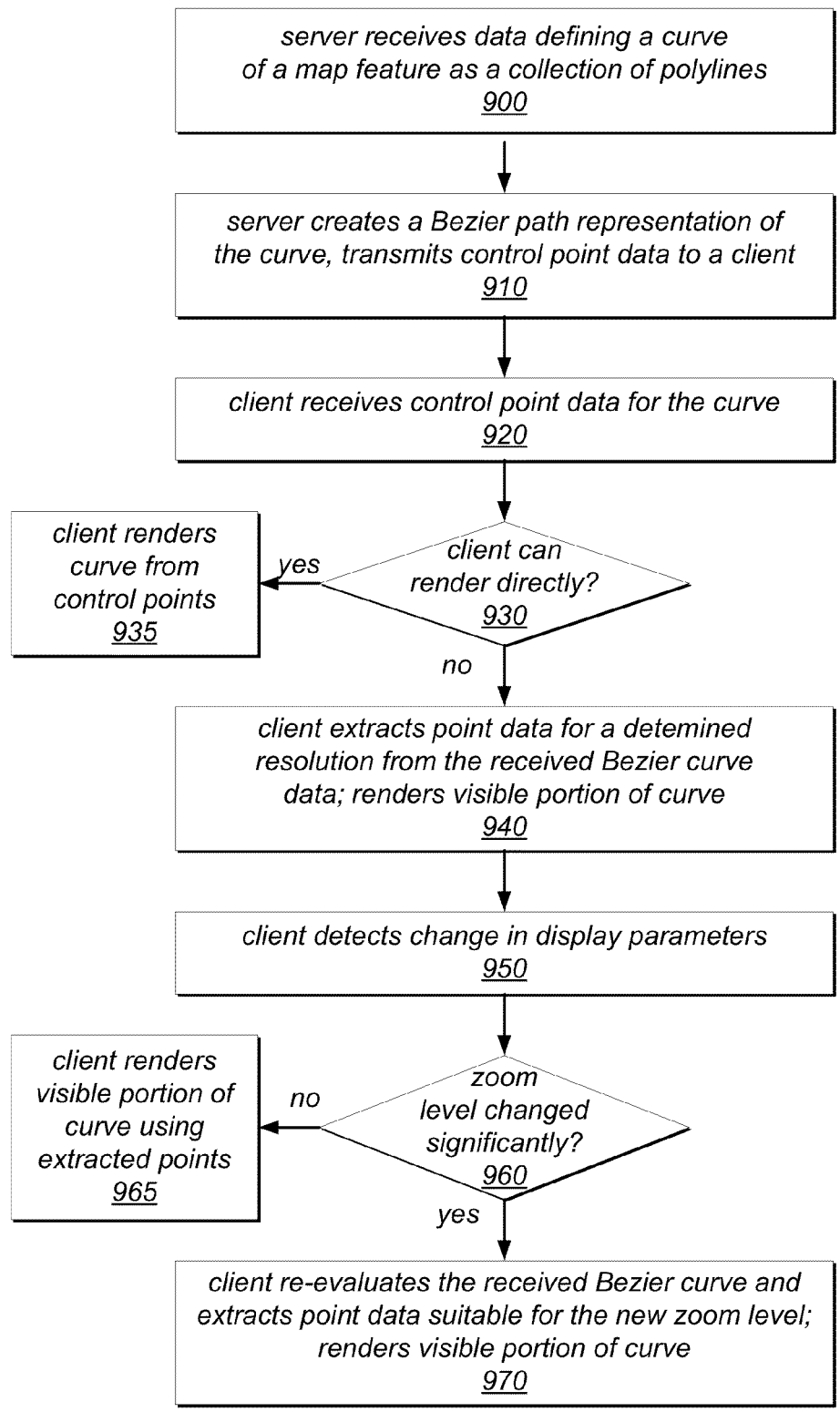
FIG. 9 is a flow diagram illustrating one embodiment of a method for loading and rendering curved features of a map within a client/server architecture.

One embodiment of a method for loading and rendering curved features in a map is illustrated by the flow diagram in FIG. 9. As illustrated at 900, in this example, the method may include a server receiving data defining a curve of a map feature as a collection of polylines. For example, the server may receive or obtain digitized map data from a map vendor, map service, database of map information, or another source of digitized map data. As illustrated in this example, the method may include the server creating a Bézier path representation of the curve, and transmitting data representing the control points of the Bézier curve to a client for subsequent display (as in 910). Note that the server may transmit this curve data along with other data for the map in which the curved feature occurs, including, but not limited to, text to be displayed, metadata associated with the map, and/or polylines representing straight road segments and/or rectangular features, such as buildings, signs, labels, etc.

As illustrated in this example, the method may include the client receiving the control point data for the curve (along with any other map data), as in 920. If the client can render the curved feature directly from the received control point data (e.g., if there is a GPU with sufficient capability and/or capacity available), the method may include the client rendering the curve of the feature from the control points. This is illustrated in FIG. 9 as the positive exit from 930 and element 935. On the other hand, if the client cannot render the curved feature directly from the received control point data (e.g., if there is not an available GPU with sufficient capability or capacity, or the client device is otherwise overloaded), the method may include the client extracting point data corresponding to a determined resolution at which the curved map feature will be displayed from the received Bezier curve data, and rendering the visible portion of curve using the extracted point data (e.g., as vertices of a triangle strip or mesh), as in 940. As previously noted, the client may extract data only for points on the visible portion of the curve or for the whole curve, in different embodiments.

As illustrated in this example, the method may include the client detecting a change in one or more display parameters of the device on which the curved feature is being displayed (as in 950). For example, the client may detect that the map has been re-centered at a new location, that the resolution of the display screen has been changed, and/or that the zoom level for the map being displayed has changed. If the zoom level of the display has not changed significantly, the method may include the client rendering the visible portion of curve using the previously extracted point data (as in 965). However, if the zoom level of the display has changed significantly, the method may include the client re-evaluating the received Bézier curve data, extracting point data suitable for the new zoom level, and rendering the visible portion of curve using the newly extracted point data (e.g., as vertices of a new triangle strip or mesh), as in 970. For example, the method may include the client re-evaluating the curve and extracting a different number of vertices for the curve in response to determining that the zoom level has changed by an amount or percentage that is greater than a pre-determined threshold amount or percentage (e.g., if the zoom level has doubled).

Note that while many of the examples described herein are directed to embodiments in which a map tool, mapping application, and/or navigation application are implemented in a client/server architecture, in other embodiments, they may be implemented in other types of operating environments (e.g., in a cloud computing environment, or on a single computing device). For example, in some embodiments, a standalone map tool executing on a single computing device may perform a pre-processing (or background processing) operation on digitized map data in order to fit Bézier curves (or another parametric curve representation) to the digitized data that represents a curved map feature, and may store that curve data for subsequent use. The map tool may then evaluate the stored curve data to convert it back into points (and corresponding triangles) for display on an as-needed basis (dependent on current performance, workload, display characteristics, etc.)

Map Tool Module

Figure 10:
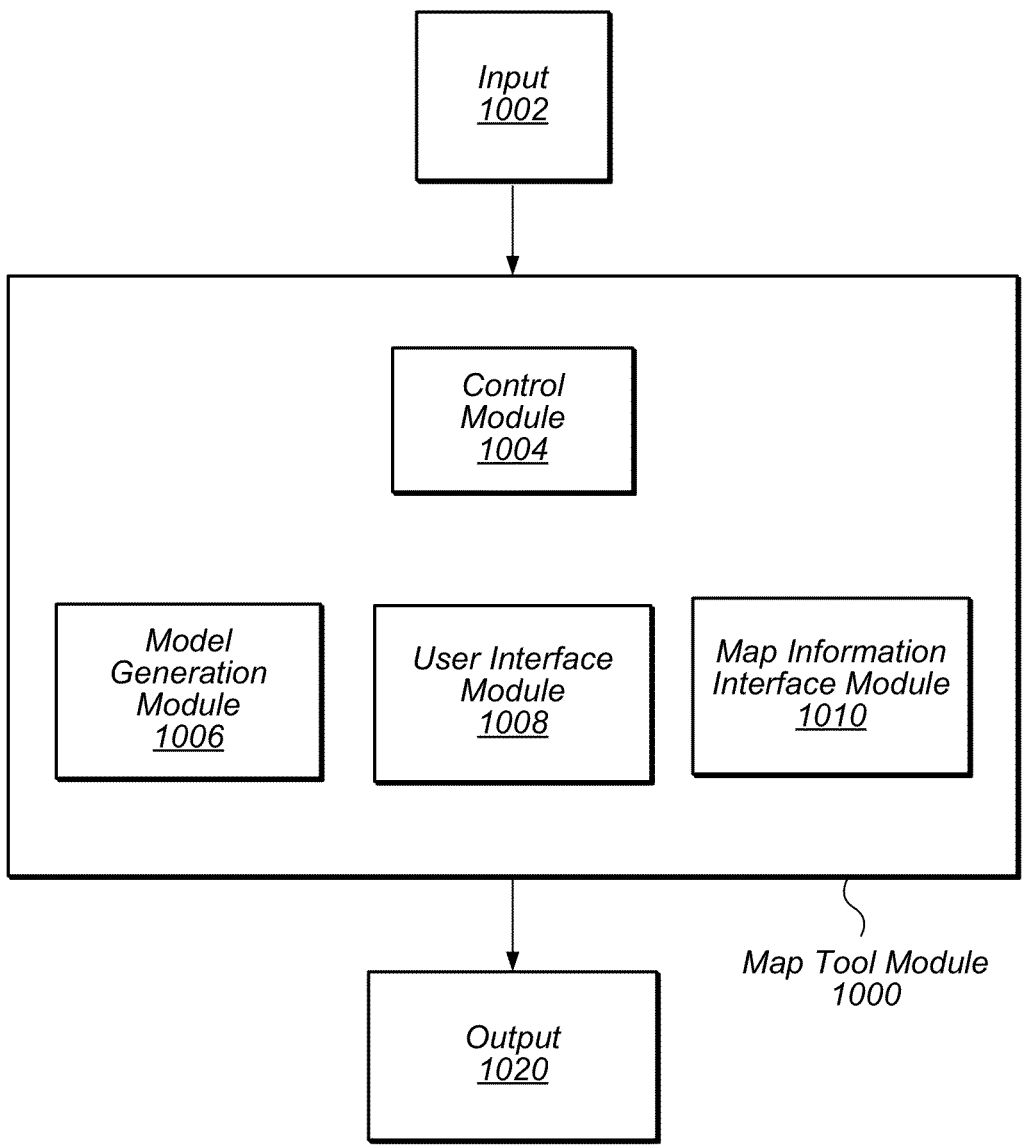
FIG. 10 illustrates a map tool module, according to some embodiments.

FIG. 10 illustrates one embodiment of a map tool module 1000. The map tool module 1000 may be implemented using a variety of different configurations to provide various functions of a map tool, including, but not limited to, those described herein. In the example illustrated in FIG. 10, the map tool module 1000 includes a control module 1004, a model generation module 1006, a user interface module 1008, and a map information interface module 1010.

In some embodiments, control module 1004 may receive input 1002, which may include various types of mapping information, as described herein. Given the mapping information, control module 1004 may invoke model generation module 1006 to generate a model of the environment corresponding to the received mapping information, according to various embodiments discussed herein. In some embodiments, input 1002 may include polylines that represent curved features. In other embodiments, input 1002 may include parametric curve data representing one or more curved features of a map to be displayed. Given input that includes polylines and/or parametric curve data, model generation module 1006 may applying any or all of the techniques described herein for rendering curved feature(s) within the map. For example, model generation module 1006 may detect a curved feature within received map data, generate a parametric curve representation of the curved feature, determine a resolution at which a curved feature is to be displayed, determine a number of points along the curve for which data should be extracted from the received parametric curve data, extract data for those points, and/or render the curved feature based on that extracted data (e.g., using the extracted data to define the vertices of a triangle mesh that is then rendered).

Given a model of the environment, control module 1004 may invoke user interface module 1008 in response to various user inputs indicating, among other things, a selection of an object within a map view, information for labeling an object in the map view, or a request for more information or for specific information regarding an object in the map view, or a change in one or more display characteristics or parameters. In some embodiments, depending on the input, map tool module 1000 may communicate with a map service (such as map service 1330 illustrated in FIG. 13) through map information interface module 1010 to request and/or receive mapping information. Depending on the embodiment and current state, control module 1004 may provide a display of a map view as output 1020.

Note that the modules illustrated in FIG. 10 (e.g., control module 1004, model generation module 1006, user interface module 1008, and/or map information interface module 1010) may be implemented in hardware, in software, or in any combination thereof, in different embodiments. For example, any or all of these modules may be implemented as program instructions encoded on a non-transitory, computer-readable medium that when executed on one or more computers cause the computers to perform the functionality described herein.

Example Embodiment

Client/Server Architecture

Figure 11:
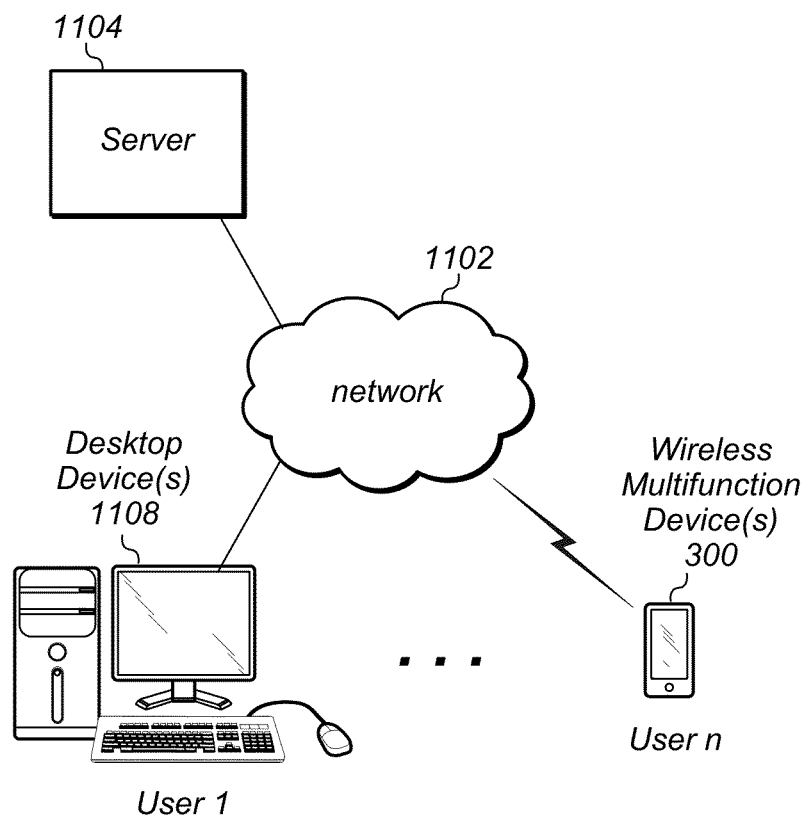
FIG. 11 illustrates a client/server architecture in which some embodiments of a map tool may operate.

FIG. 11 illustrates one embodiment of a computing environment in which various devices implementing a map tool may operate. In this example, the computing environment includes a server 1104, one or more desktop devices 1108 that serve as client devices, and one or more wireless multifunction devices 300 (such as those illustrated in FIGS. 3, 4A, 4B, and 5 and described in detail above) that serve as client devices. As illustrated in this example, multiple users (illustrated in FIG. 11 as Users 1-n) may communicate with server 1104 and/or each other over network 1102 using desktop devices 1108 and/or wireless multifunction devices 300. In some embodiments, a user at a desktop machine (e.g., one of desktop devices 1108) may enter an address of any given structure, or a coordinate, or an identifier of a landmark, or the user may simply navigate to a given map location. Once the user arrives at a map location (i.e., once the desired location has been displayed to the user), the user may navigate as a user on a mobile device would navigate. In this way, without moving, a user at a stationary machine may navigate through a given map view such that the above-mentioned embodiments of a map tool may operate to present the user with a map view that is similar to the map view that a mobile user would see.

In the example illustrated in FIG. 10, server 1104 may receive or access digitized map data that includes polylines representing one or more curved features, detect the curved feature(s), convert the polylines to Bézier curve representation(s), and send data representing the Bézier curve(s) to one or more client devices (e.g., one or more of desktop devices 1108 and/or wireless multifunction devices 300). In this example, the client device(s) devices (e.g., one or more of desktop devices 1108 and/or wireless multifunction devices 300) may choose to render the curve(s) directly from the received Bézier curve data, or to extract point data from the curve data and render the curves using the extracted point data to define the vertices of corresponding triangle strips or triangle meshes, as described herein.

Example Embodiment

Cloud Computing Environment

Figure 12:
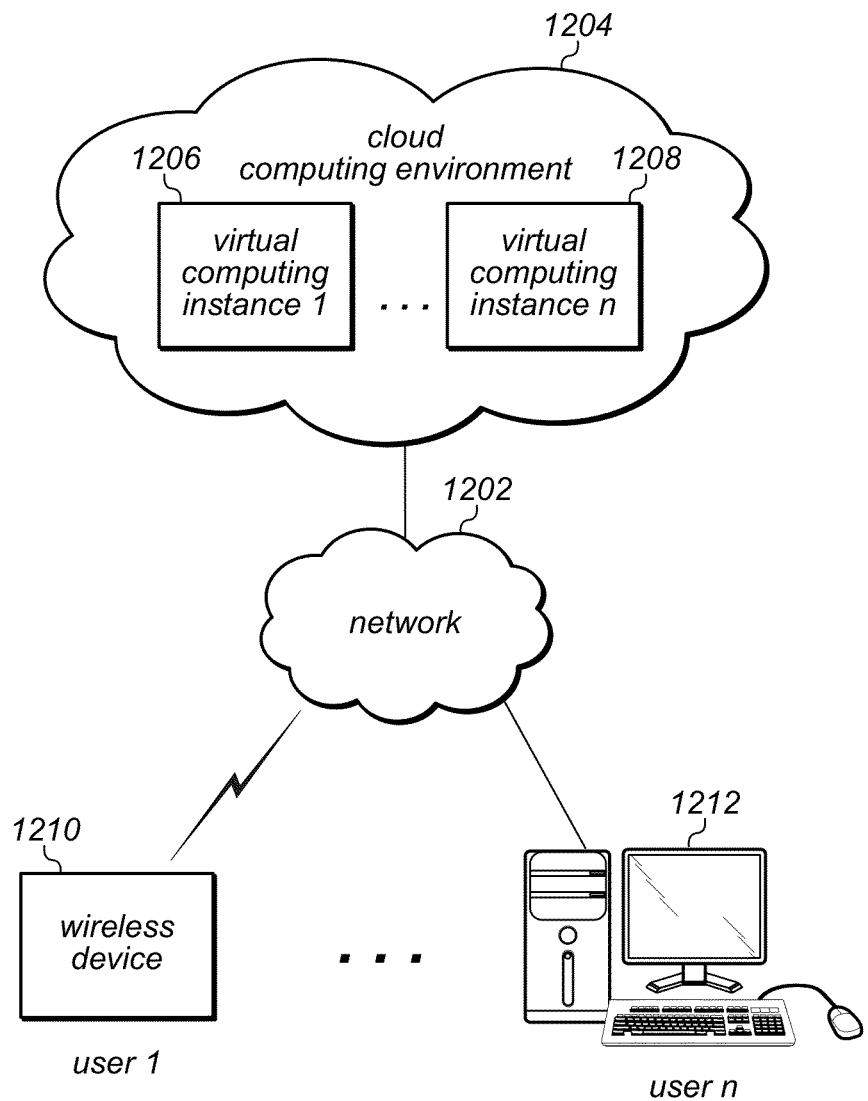
FIG. 12 illustrates a cloud computing environment in which some embodiments of a map tool may operate.

FIG. 12 illustrates another embodiment of a computing environment in which various devices implementing a map tool may operate. In this example, the computing environment includes multiple wired and/or wireless devices that access a cloud computing environment 1204 over network 1202. The cloud computing environment includes virtual computing instances 1-n, illustrated as elements 1206 through 1208. As illustrated in this example, an installed application on a wireless device 1210 or on a wired computer 1212 may be used to access any of the above-discussed embodiments of a map tool executing within one of the virtual computing instances 1206 through 1208. For example, a user (e.g., one of multiple users 1-n) may log into the cloud computing environment 1204 through the installed application to access a virtual computing instance within which an embodiment of the map tool is executing or may be executed.

In other embodiments, including those implementing a client/server architecture, as described herein, the map tool may be implemented as a client application on a wireless device 1210 or on a wired computer 1212 that accesses a cloud computing environment 1204 over network 1202 (e.g., to obtain or process map data).

Map Service Operating Environment

Figure 13:
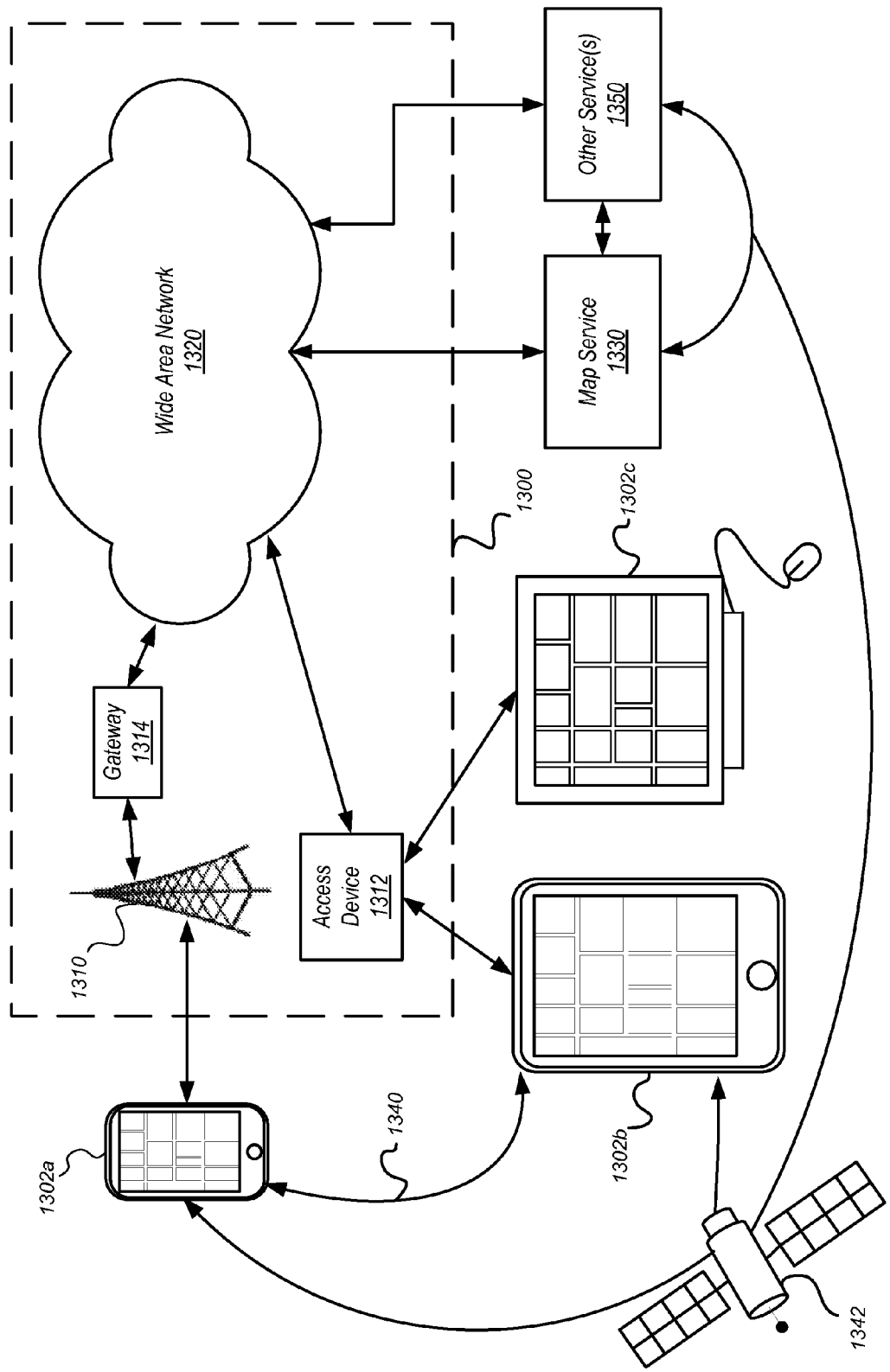
FIG. 13 illustrates an example map service operating environment configured to implement aspects of a system and method for loading and/or rendering curved features in a map.

Various embodiments may operate within a map service operating environment. FIG. 13 illustrates a map service operating environment, according to some embodiments. A map service 1330 may provide map services for one or more client devices 1302*a*-1302*c* in communication with the map service 1330 through various communication methods and protocols. A map service 1330 generally may provide services, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). Client devices 1302*a*-1302*c* may utilize these map services by obtaining map service data. Client devices 1302*a*-1302*c* may implement various techniques to process map service data. Client devices 1302*a*-1302*c* may then provide map services to various entities, including, but not limited to, users, internal software or hardware modules, and/or other systems or devices external to the client devices 1302*a*-1302*c*.

In some embodiments, a map service may be implemented by one or more nodes in a distributed computing system. Each node may be assigned one or more services or component of a map service. Some nodes may be assigned the same map service or component of a map service. A load balancing node may distribute access or requests to other nodes within a map service. In some embodiments a map service may be implemented as a single system, for example a single server. Different modules or hardware devices within a server may implement one or more of the various services provided by a map service.

A map service may provide map services by generating map service data, which a map service may compose in varying formats for varying services. In some embodiments, one format of map service data may be map image data. Map image data may provide image data to a client device so that the client device may process the image data (e.g., rendering and/or displaying the image data as a two-dimensional or three-dimensional map). Map image data, whether in two or three dimensions, may be composed utilizing map tiles. A map tile is a portion of a larger map image. Assembling together the map tiles of a map may produce the original map. Tiles may be composed of map image data, routing or navigation data, or any other map service data. In some embodiments map tiles may be raster-based map tiles, with tile sizes ranging from any size both larger and smaller than the standard 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles may be vector-based map tiles, encoded using vector graphics, including, but not limited to, Scalable Vector Graphics (.svg) or Drawing File (.drw). Embodiments may also include tiles with a combination of vector and raster data. Metadata or other information concerning the map tile may also be included within or along with a map tile, providing further map service data to a client device. It will be apparent to those of ordinary skill in the art that a map tile may be encoded for transport utilizing various well-known data structures and protocols, some of which are described in various examples below.

A map service may perform various techniques to analyze a map tile before encoding the tile for transport. This analysis may optimize map service performance for both client devices and a map service. In some embodiments map tiles may be analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile may contain certain mask values, which are associated with one or more textures. Embodiments may also analyze map tiles for specified features that may be associated with certain map styles that contain style identifiers.

Other map services may generate map service data relying upon various data formats separate from a map tile. For example, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Embodiments may format requests for a map as requests for certain map tiles. In some embodiments, requests may also supply the map service with starting locations (or current locations) and destination locations for a route calculation. A client device may also request map service rendering information, such as map textures or stylesheets. In at least some embodiments, requests may also be one of a series of requests implementing turn-by-turn navigation. Requests for other geographic data may include, but are not limited to, current location, wireless network coverage, weather, traffic information, or nearby points-of-interest.

A map service may, in some embodiments, may analyze client device requests to optimize a device or map service operation. For example, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices 1302a-1302c may be implemented. One such example is a portable-multifunction device illustrated in FIGS. 1 through 3. Client devices 1302a-1302c may utilize map service 1330 through various communication methods and protocols described below. In some embodiments, client devices 1302a-1302c may obtain map service data from map service 1330. Client devices 1302a-1302c may request or receive map service data. Client devices 1302a-1302c may then process map service data (e.g., render and/or display the data) and may send the data to another software or hardware module on the device or to an external device or system.

A client device may, according to some embodiments, implement techniques to render and/or display maps. These maps may be requested or received in various formats, such as map tiles described above. A client device may render a map in two-dimensional or three-dimensional views. Some embodiments of a client device may display a rendered map and allow a user, system, or device providing input to manipulate a virtual camera in the map, changing the map display according to the virtual camera's position, orientation, and field-of-view. Various forms and input devices may be implemented to manipulate a virtual camera. In some embodiments, touch input, through certain single or combination gestures (e.g., touch-and-hold or a swipe) may manipulate the virtual camera. Other embodiments may allow manipulation of the device's physical location to manipulate a virtual camera. For example, a client device may be tilted up from its current position to manipulate the virtual camera to rotate up. In another example, a client device may be tilted forward from its current position to move the virtual camera forward.

Other input devices to the client device may be implemented including, but not limited to, auditory input (e.g., spoken words), a physical keyboard, mouse, and/or a joystick.

Embodiments may provide various visual feedback to virtual camera manipulations, such as displaying an animation of possible virtual camera manipulations when transitioning from two-dimensional map views to three-dimensional map views. Embodiments may also allow input to select a map feature or object (e.g., a building) and highlight the object, producing a blur effect that maintains the virtual camera's perception of three-dimensional space.

In some embodiments, a client device may implement a navigation system (e.g., turn-by-turn navigation). A navigation system provides directions or route information, which may be displayed to a user. Embodiments of a client device may request directions or a route calculation from a map service. A client device may receive map image data and route data from a map service. In some embodiments, a client device may implement a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera may be implemented to manipulate navigation map data according to some embodiments. Some embodiments of client devices may allow the device to adjust the virtual camera display orientation to bias toward the route destination. Embodiments may also allow virtual camera to navigation turns simulating the inertial motion of the virtual camera.

Client devices may implement various techniques to utilize map service data from map service. Embodiments may implement some techniques to optimize rendering of two-dimensional and three-dimensional map image data. In some embodiments, a client device may locally store rendering information. For example, a client may store a stylesheet which provides rendering directions for image data containing style identifiers. In another example, common image textures may be stored to decrease the amount of map image data transferred from a map service. Client devices may also implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices may also order or prioritize map service data in certain techniques. For example, a client device may detect the motion or velocity of a virtual camera, which if exceeding certain threshold values, lower-detail image data will be loaded and rendered of certain areas. Other examples include: rendering vector-based curves (and/or curves for which parametric curve data is available) as a series of points (as described above), preloading map image data for areas of poor communication with a map service, adapting textures based on display zoom level, or rendering map image data according to complexity.

In some embodiments, client devices may communicate utilizing various data formats separate from a map tile. For example, some client devices may implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 13 illustrates one possible embodiment of an operating environment 1300 for a map service 1330 and client devices 1302a-1302c. In some embodiments, devices 1302a, 1302b, and 1302c can communicate over one or more wire or wireless networks 1310. For example, wireless network 1310, such as a cellular network, can communicate with a wide area network (WAN) 1320, such as the Internet, by use of gateway 1314. A gateway 1314 may provide a packet oriented mobile data service, such as General Packet Radio Service (GPRS), or other mobile data service allowing wireless networks to transmit data to other networks, such as wide area network 1320. Likewise, access device 1312 (e.g., IEEE 802.11g wireless access device) can provide communication access to WAN 1320. Devices 1302a and 1302b can be any portable electronic or computing device capable of communicating with a map service, such as a portable multifunction device described below with respect to FIGS. 1 to 3. Device 1302c can be any non-portable electronic or computing device capable of communicating with a map service.

In some embodiments, both voice and data communications can be established over wireless network 1310 and access device 1312. For example, device 1302a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 1310, gateway 1314, and WAN 1320 (e.g., using Transmission Control Protocol/Internet Protocol (TCP/IP) or User Datagram Protocol (UDP)). Likewise, in some implementations, devices 1302b and 1302c can place and receive phone calls, send and receive e-mail messages, and retrieve electronic documents over access device 1312 and WAN 1320.

Devices 1302a and 1302b can also establish communications by other means. For example, wireless device 1302a can communicate with other wireless devices (e.g., other devices 1302a or 1302b, cell phones) over the wireless network 1310. Likewise devices 1302a and 1302b can establish peer-to-peer communications 1340 (e.g., a personal area network) by use of one or more communication subsystems, such as Bluetooth® communication from Bluetooth Special Interest Group, Inc. of Kirkland, Wash. 1302c can also establish peer to peer communications with devices 1302a or 1302b. (not pictured). Other communication protocols and topologies can also be implemented. Devices 1302a and 1302b may also receive Global Positioning Satellite (GPS) signals from GPS 1342.

Devices 1302a, 1302b, and 1302c can communicate with map service 1330 over the one or more wire and/or wireless networks, 1310 or 1312. For example, map service 1330 can provide a map service data to rendering devices 1302a, 1302b, and 1302c. Map service 1330 may also communicate with other services 1350 to obtain data to implement map services. Map service 1330 and other services 1350 may also receive GPS signals from GPS 1340.

Example Computer System

Figure 14:
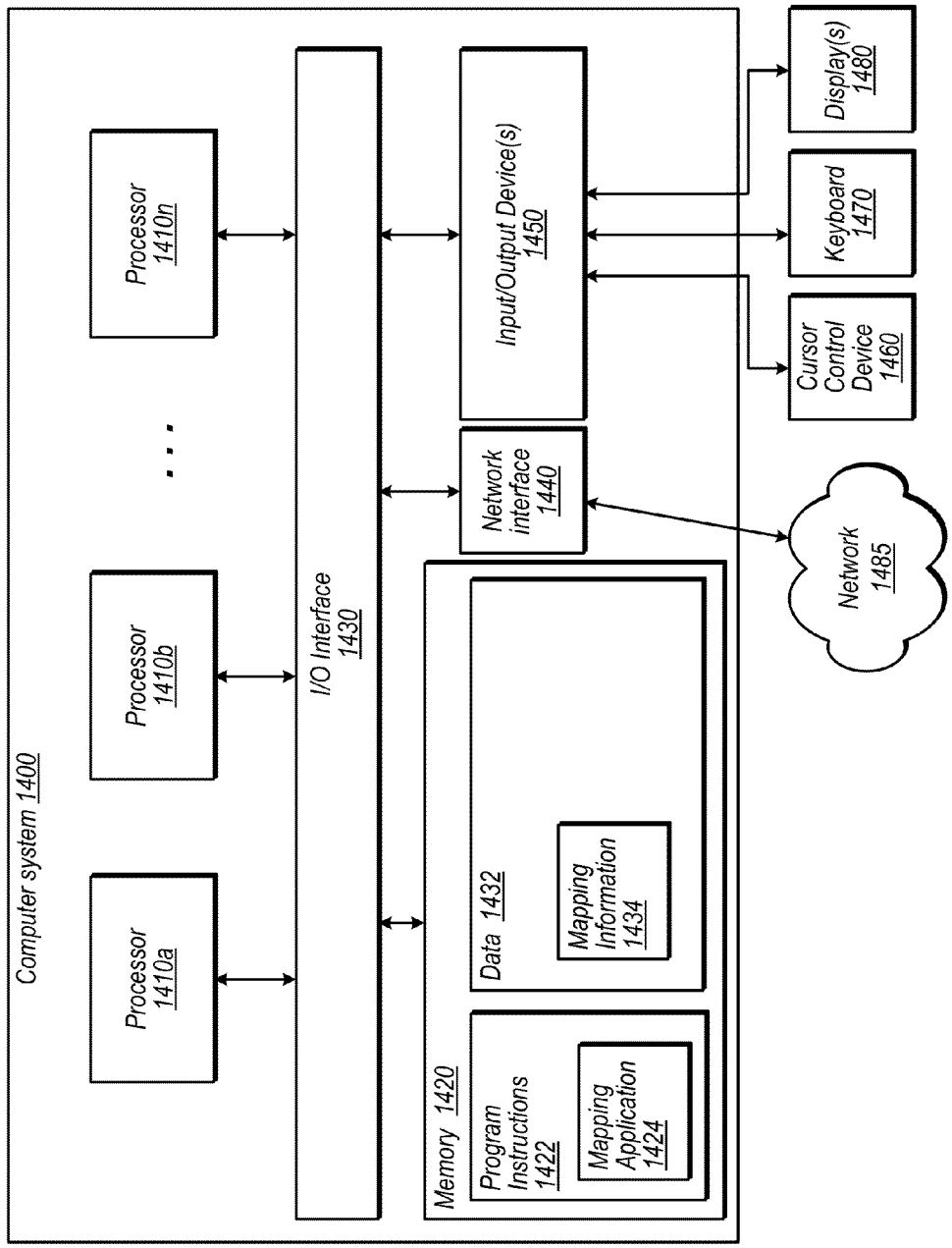
FIG. 14 illustrates an example computer system configured to implement aspects of the system and method for loading and/or rendering curved features in a map.

FIG. 14 illustrates computer system 1400 that is configured to execute any or all of the embodiments described above. In different embodiments, computer system 1400 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for loading and/or rendering curved features in a map, as described herein, may be executed on one or more computer systems 1400, which may interact with various other devices. Note that any component, action, or functionality described above with respect to FIGS. 1-13 may be implemented on one or more computers configured as computer system 1400 of FIG. 14, according to various embodiments. In the illustrated embodiment, computer system 1400 includes one or more processors 1410 coupled to a system memory 1420 via an input/output (I/O) interface 1430. Computer system 1400 further includes a network interface 1440 coupled to I/O interface 1430, and one or more input/output devices 1450, such as cursor control device 1460, keyboard 1470, and display(s) 1480. In some cases, it is contemplated that embodiments may be implemented using a single instance of computer system 1400, while in other embodiments multiple such systems, or multiple nodes making up computer system 1400, may be configured to host different portions or instances of embodiments. For example, in one embodiment some elements may be implemented via one or more nodes of computer system 1400 that are distinct from those nodes implementing other elements.

In various embodiments, computer system 1400 may be a uniprocessor system including one processor 1410, or a multiprocessor system including several processors 1410 (e.g., two, four, eight, or another suitable number). Processors 1410 may be any suitable processor capable of executing instructions. For example, in various embodiments processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

System memory 1420 may be configured to store program instructions 1422 and/or data 1432 accessible by processor 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions 1422 may be configured to implement a mapping application 1424 incorporating any of the functionality described above. Additionally, data 1432 of memory 1420 may include mapping information 1434 including any of the information or data structures described above, including but not limited to mapping information for rendering map instances, position information indicating past or current positions of the user, parametric curve data defining a curve of a map feature, data defining map features using polylines, data defining a curve of a map feature using a series of points extracted from parametric curve data, and/or route information for navigating from an origination to a destination. In some embodiments, program instructions and/or data may be received, sent or stored upon different types of computer-accessible media or on similar media separate from system memory 1420 or computer system 1400. While computer system 1400 is described as implementing the functionality of functional blocks of previous Figures, any of the functionality described herein may be implemented via such a computer system.

In one embodiment, I/O interface 1430 may be configured to coordinate I/O traffic between processor 1410, system memory 1420, and any peripheral devices in the device, including network interface 1440 or other peripheral interfaces, such as input/output devices 1450. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices attached to a network 1485 (e.g., carrier or agent devices) or between nodes of computer system 1400. Network 1485 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1450 may, in some embodiments, include one or more display terminals, keyboards, keypads, touchpads, scanning devices, voice or optical recognition devices, or any other devices suitable for entering or accessing data by one or more computer systems 1400. Multiple input/output devices 1450 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1440.

As shown in FIG. 14, memory 1420 may include program instructions 1422, which may be processor-executable to implement any element or action described above. In one embodiment, the program instructions may implement the methods described above, such as the methods illustrated by FIG. 8. In other embodiments, different elements and data may be included. Note that data 1432 may include any data or information described above.

Those skilled in the art will appreciate that computer system 1400 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A method for rendering a feature in a map, comprising:
performing, by a computer:
receiving data defining a curve of the feature as a Bézier path;
determining a resolution of the feature to be displayed, wherein said determining is dependent on a performance characteristic of a device on which the feature is to be rendered;
determining a number of points on the curve for which data is to be extracted from the received data dependent on the determined resolution of the feature;
extracting data representing each of the determined number of points on the curve from the received data;
rendering the feature within the map dependent on the extracted data; and
in response to a changed zoom level at which the feature is displayed:
determining, based at least on the changed zoom level and on the data defining the curve of the feature of the Bezier path used in said determining the number of points on the curve, a different number of points on the curve for which data is to be extracted;
extracting data representing the different number of points on the curve from the received data; and
rendering the feature in the map dependent on the extracted data representing the different number of points on the curve.

2. The method of claim 1, wherein said rendering comprises:
creating a collection of triangles that represents the feature and whose vertices are defined by the extracted data representing the determined number of points; and
rendering the collection of triangles.

3. The method of claim 1, wherein said determining the number of points is dependent on a distance between endpoints of a portion of the feature that will be visible when the feature is displayed, or a zoom level at which the feature is to be displayed.

4. The method of claim 1, wherein said determining the number of points is dependent on one or more of: a performance characteristic of a processor of the device on which the feature is to be rendered, or a number of map features to be rendered simultaneously.

5. A multifunction device, comprising:
one or more processors; and
one or more memories storing a mapping application that is executable on the one or more processors to:
receive data defining a curve of a feature of a map using a parametric curve representation;
determine a resolution of the feature to be displayed on the multifunction device;
determine a number of points on the curve for which data is to be extracted from the received data dependent on the determined resolution;
extract data representing each of the determined number of points on the curve from the received data;
generate a collection of triangles that represents the feature and whose vertices are defined by the extracted data;
render the feature within the map dependent on the collection of triangles generated from the extracted data; and
in response to a changed zoom level at which the feature is displayed:
determine, based at least on the changed zoom level, a different number of points on the curve for which data is to be extracted from the received data;
extract data representing the different number of points on the curve from the received data; and
render the feature in the map dependent on the extracted data representing the different number of points on the curve.

6. The multifunction device of claim 5,
wherein at least one of the one or more processors is a graphics processing unit (GPU); and
wherein rendering the feature comprises the GPU rendering the collection of triangles.

7. The multifunction device of claim 5, wherein determining the number of points is dependent on a distance between endpoints of a portion of the feature that will be visible when the feature is displayed, or a zoom level at which the feature is to be displayed.

8. The multifunction device of claim 5, wherein said determining the number of points is dependent on one or more of: a screen resolution for the multifunction device, a performance characteristic of a processor of the multifunction device, or a number of map features to be rendered simultaneously on the multifunction device.

9. The multifunction device of claim 5,
wherein the changed zoom level at which the feature is being displayed has changed by an amount or percentage greater than a pre-determined threshold amount or percentage.

10. A non-transitory, computer-readable storage medium, storing program instructions executable on a computer to implement a mapping application configured to:
obtain data defining a curve as a parametric curve representation, wherein the curve is a feature in a map;
determine a number of points on the curve for which data is to be extracted from the obtained data;
extract data representing each of the determined number of points on the curve from the obtained data;
render the curve within the map dependent on the extracted data; and
in response to a changed zoom level at which the feature is displayed:
determine, based at least on the changed zoom level, a different number of points on the curve for which data is to be extracted from the received data;
extract data representing the different number of points on the curve from the received data; and
render the feature in the map dependent on the extracted data representing the different number of points on the curve.

11. The non-transitory, computer-readable storage medium of claim 10, wherein the mapping application is further configured to:
determine the number of points based on one or more performance characteristics including computing capability or current workload of the computer.

12. The non-transitory, computer-readable storage medium of claim 10, wherein rendering the feature comprises:
creating a triangle strip or a triangle mesh that represents the feature and whose vertices are defined by the extracted data representing the determined number of points; and
rendering the triangle strip or triangle mesh.

13. The non-transitory, computer-readable storage medium of claim 10, wherein the feature comprises a curved road, a geographic feature, or a structure comprising one or more curved elements.

14. The non-transitory, computer-readable storage medium of claim 10,
- wherein determining the number of points is dependent on one or more characteristics of a multifunction device on which the feature is to be displayed; and
- wherein determining the number of points comprises detecting the multifunction device on which the feature is to be displayed.

\* \* \* \* \*